US 7,389,236 B2

(12) United States Patent
James

(10) Patent No.: US 7,389,236 B2
(45) Date of Patent: Jun. 17, 2008

(54) NAVIGATION AND DATA ENTRY FOR OPEN INTERACTION ELEMENTS

(75) Inventor: Frances James, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 827 days.

(21) Appl. No.: 10/790,218

(22) Filed: Mar. 2, 2004

(65) Prior Publication Data

US 2005/0071172 A1    Mar. 31, 2005

Related U.S. Application Data

(60) Provisional application No. 60/506,504, filed on Sep. 29, 2003.

(51) Int. Cl.
  G10L 11/00    (2006.01)
  G10L 21/00    (2006.01)
  G10L 15/22    (2006.01)
  H04M 1/64    (2006.01)

(52) U.S. Cl. .................... 704/275; 704/270; 379/88.22

(58) Field of Classification Search ................ 704/231, 704/246, 250, 270–275; 379/52, 67.1–72, 379/75, 88.01–88.04, 88.22–88.28
See application file for complete search history.

(56) References Cited

U.S. PATENT DOCUMENTS

| | | | | |
|---|---|---|---|---|
| 4,580,012 A | * | 4/1986 | Matthews et al. | 379/245 |
| 5,179,627 A | * | 1/1993 | Sweet et al. | 704/200 |
| 5,619,708 A | | 4/1997 | Ho | |
| 5,805,676 A | * | 9/1998 | Martino | 379/93.17 |
| 6,125,347 A | * | 9/2000 | Cote et al. | 704/275 |
| 6,212,408 B1 | * | 4/2001 | Son et al. | 455/563 |
| 6,246,981 B1 | * | 6/2001 | Papineni et al. | 704/235 |
| 6,347,226 B1 | * | 2/2002 | Virtanen | 455/450 |
| 6,574,601 B1 | * | 6/2003 | Brown et al. | 704/270.1 |
| 2001/0043234 A1 | | 11/2001 | Kotamarti | |
| 2002/0010715 A1 | | 1/2002 | Chinn et al. | |
| 2002/0032566 A1 | * | 3/2002 | Tzirkel-Hancock et al. | 704/241 |
| 2002/0143533 A1 | | 10/2002 | Lucas et al. | |
| 2002/0198719 A1 | * | 12/2002 | Gergic et al. | 704/270.1 |
| 2003/0023444 A1 | * | 1/2003 | St. John | 704/270.1 |
| 2004/0006474 A1 | * | 1/2004 | Gong et al. | 704/270.1 |
| 2004/0015325 A1 | * | 1/2004 | Hirano et al. | 702/152 |
| 2004/0073431 A1 | * | 4/2004 | Galanes et al. | 704/270.1 |

OTHER PUBLICATIONS

Lernout and Houspie, "Dragon Naturally Speaking 5," Dragon Naturally Speaking User's Guide, Oct. 2000, pp. 1-131.

(Continued)

*Primary Examiner*—David R. Hudspeth
*Assistant Examiner*—David Kovacek
(74) *Attorney, Agent, or Firm*—Fish & Richardson P.C.

(57) ABSTRACT

Techniques for using open interaction elements (OIEs) in voice-enabled systems are described. OIEs include multi-select and dictation fields of a user interface, into which a user may enter multiple selections or free-form information. To allow the user to exit from such OIEs, that is, to change from a data entry mode to a navigation mode, multiple exit strategies may be simultaneously enabled for use by the user. For example, an explicit exit command may be available to the user, in addition to an implicit exit command or time-out exit strategy. In this way, users may individually select a preferred or practical way of exiting an OIE.

14 Claims, 14 Drawing Sheets

OTHER PUBLICATIONS

Foley et al., "Computer Graphics, Principles and Practice," Addison-Wesley, Reading, US, 1996, pp. 1-49.

James and Roelands, "Voice over Workplace (VoWP): Voice Navigation in a Complex Business GUI," Proccedings of the fifth international ACM conference on Assistive technologies, Edinburgh, Scotland, 2002, ACM Press, NY, NY, pp. 197-204.

'Using small screen space more efficiently' [online]. Kamba et al., 1996, [retrieved on Jan. 16, 2007]. Retrieved from the Internet: <URL: http://delivery.acm.org/10.1145/240000/238582/p383-kamba.pdf?key1=238582&key2=1123698611&co11=portal&dl=ACM&CFID=11586080&CFTOKEN=77013129>, 8 pages.

James, Frankie, et al., "Voice Over Workplace (VoWP): Voice Navigation in a Complex Business GUI," *Proceedings of the 5th International ACM Conference on Assistive Technologies (Assets 2002)*, Jul. 8-10, 2002, pp. 197-204.

Jackson, Judy, et al. 'Portable Speech Acessor' [online]. *Proceedings of CSUN 98*, Mar. 1998, [retrieved on Feb. 10, 2005]. Retrieved from the Internet: <URL: http://www.csun.edu/cod/conf/1998/proceedings/csun98_044.htm>.

Malkewitz, Rainer. 'Head Pointing and Speech Control as a Hands-Free Interface to Desktop Computing.' *Proceedings of the Third International ACM Conference on Assistive Technologies (Assets '98)*, Apr. 15-17, 1998, pp. 182-188.

Manaris, Bill, et al. SuiteKeys: A Speech Understanding Interface for the Motor-Control Challenged [online]. *Proceedings of The Third International ACM Conference on Assistive Technologies (Assets '98)*, Apr. 15-17, 1998, pp. 108-115, [retrieved on Mar. 1, 2005]. Retrieved from the Internet: <URL: http://www.cs.cofc.edu/~manaris/publications/suitekeys.html>.

Monk, Andrew F. 'Mode errors: A User-Centred Analysis and Some Preventative Measures Using Keying-Contingent Sound.' *International Journal of Man-Machine Studies*, vol. 24, No. 4, pp. 313-327.

Mostow, Jack, et al. 'Demonstration of a Reading Coach that Listens,' *Proceedings of the Eighth Annual Symposium on User Interface Software and Technology*, Nov. 1995, pp. 77-78.

Perry, John, et al. 'Disability, Inability and Cyberspace.' In *Human Values and the Design of Computer Technology*, B. Friedman, ed. CSLI Publications, Stanford, CA, 1997.

Resnick, Paul, et al. 'Skip and Scan: Cleaning Up Telephone Interfaces.' *Proceedings of ACM CHI'92 Conference on Human Factors in Computing Systems*, Apr. 1992, pp. 419-426.

Schmandt, Chris. 'Employing Voice Back Channels to Facilitate Audio Document Retrieval.' *Proceedings of Supporting Group Work*, Palo Alto, CA, 1988, ACM Press, pp. 213-218.

Trupin, Laura, et al. 'Trends in Labor Force Participation Among Persons with Disabilities, 1983-1994.' *Disability Statistics Report*, 10. 1997. Washington, DC: U.S. Department of Education, National Institute on Disability and Rehabilitation Research, [online], 1997 [retrieved on Mar. 1, 2005]. Retrieved from the Internet: <http://www.empowermentzone.com/dsblabor.txt>.

\* cited by examiner

FIG. 21

NAVIGATION AND DATA ENTRY FOR OPEN INTERACTION ELEMENTS

CROSS-REFERENCE TO RELATED APPLICATIONS

This application claims priority from U.S. Provisional Application No. 60/506,504, filed Sep. 29, 2003, and titled "DATA ENTRY FOR MULTI-SELECT AND DICTATION ELEMENTS."

TECHNICAL FIELD

This description is directed to a voice-controlled user interface, and, more particularly, to voice-controlled or voice-assisted techniques for navigation and data entry.

BACKGROUND

Much of software used in business today takes the form of complex graphical user interfaces (GUIs). Complex GUIs allow users to perform many tasks simultaneously while maintaining the context of the rest of their work; however, such systems are often mouse- and keyboard-intensive, which can be problematic or even impossible to use for many people, including those with physical disabilities. Voice interfaces can provide an accessible solution for physically disabled users, if steps are taken to address inherent usability problems, such as user efficiency and ambiguity handling. Additionally, voice interfaces may increase the efficiency of performing certain tasks.

Large resources have been expended to develop web-based applications to provide portable, platform-independent front ends to complex business applications using, for example, the hypertext markup language (HTML) and/or JavaScript™.

Because software applications have typically been developed with only the visual presentation in mind, little attention has been given to details that would facilitate the development of voice interfaces.

In most computer or data processing systems, user interaction is provided using only a video display, a keyboard, and a mouse. Additional input and output peripherals are sometimes used, such as printers, plotters, light pens, touch screens, and bar code scanners; however, the vast majority of computer interaction occurs with only the video display, keyboard, and mouse. Thus, primary human-computer interaction is provided through visual display and mechanical actuation. In contrast, a significant proportion of human interaction is verbal. It is desirable to facilitate verbal human-computer interaction to increase access for disabled users and to increase the efficiency of user interfaces.

Various technologies have been developed to provide some form of verbal human-computer interactions, ranging from simple text-to-speech voice synthesis applications to more complex dictation and command-and-control applications. The various types of verbal computer-human interaction applications may be described by two factors: (1) the presence or absence of a visual component; and (2) the extent to which the underlying application and interaction is changed when a voice interface is added.

Many research organizations building verbal human-computer interaction systems focus on the second factor: creating new interaction styles that may be used in conjunction with or in lieu of a visual display. For example, various organizations have created the following systems: CommandTalk; ATIS; TOOT; and ELVIS. Each of these systems focuses on providing improved models for verbal human-computer interaction, fundamentally changing the interaction style. For example, CommandTalk maintains a traditional GUI, while fundamentally changing the interaction style to improve usability. ATIS, an air travel information system, maintains a traditional visual component by enabling answers to user queries in a visual tabular format; however, ATIS modifies conventional interaction styles, moving from a database query interface to a natural language query interface. Similarly, TOOT, a train schedule information system, attempts to present tabular data to users; however, TOOT provides the tabular data by voice, eliminating the need for a visual component. Finally, the ELVIS system for accessing email messages by voice has been tested with several interaction styles, which differ from the visual interaction to varying degrees. The system-initiative style makes use of many of the same command names found in the visual interface, while providing a mixed-initiative style significantly changes conventional interactions.

Many commercial systems tend to maintain conventional interaction styles with varying degrees of visual components. Windows access tools such as ViaVoice™ and SUITEKeys mirror the keyboard/mouse interaction to a greater degree than any of the dialogue systems mentioned above. SUITEKeys even goes so far as to directly mimic the interaction of moving the mouse by hand and pressing individual keys. Similarly, many telephony applications mimic the keypad interaction directly with interactions that take the form of "press or say 1."

Enormous resources have been used to develop business applications requiring complex GUIs to present large quantities of information, display complicated interactions within the information, and manage the complexity of maximizing user capability, configuration, and control. Existing applications provide limited support for controlling an application using voice. Some existing systems allow dictation or limited access commands; however, there is a need for systems and techniques to increase the extent of verbal human-computer interaction in conventional and legacy application to provide increased accessibility for disabled users and increased efficiency of interaction for all users.

Voice-enabled interfaces generally present at least two modes: a data entry mode (in which a user enters data such as dictated text) and a navigation mode (in which the user navigates between, to, or from elements of the interface(s)). For some elements of the voice-enabled interfaces, such as single-select elements having only one possibility for data entry (e.g., a zip code field), transitions from the data entry mode to the navigation mode are easily determined (e.g., with a zip code field, the transition may automatically occur when all five digits are received). However, when an element is an "open interaction element," (OIE) such as free-form text dictation fields, it may be difficult to determine when the user has completed entries into such a field, in a manner that is convenient and reliable for the user.

SUMMARY

In one aspect, a system for navigation and data entry for open interaction elements includes a voice-enabled user interface and a voice module operable to input data spoken by a user and operable to receive voice commands spoken by the user in both of a data entry mode associated with data entry into an element of the voice-enabled user interface and a navigation mode associated with navigating to or from the element. The system also includes an open interaction element characterized by an ability to accept multiple data entries when the voice module is in the data entry mode. The voice module is operable to enable a first exit option and a second exit option from the open interaction element for use by the user, to thereby allow the user to switch from the data entry mode to the navigation mode using either of the first exit option and the second exit option.

Implementations may include one or more of the following features. For example, the first exit option may be characterized by receipt of an explicit exit command spoken by the user, and the second exit option may be characterized by receipt of a navigation command spoken by the user.

The voice module may be operable to enable a third exit option from the open interaction element for use by the user. In this case, the third exit option is characterized by an automatic transition from the data entry mode to the navigation mode after a passing of a pre-determined period of time.

The voice module may be operable to enable a third exit option from the open interaction element for use by the user. In this case, the third exit option is characterized by a verbal command common to a plurality of elements in the voice-enabled user interface, receipt of which initiates a tabbing functionality between the open interaction element and a designated one of the plurality of elements.

The voice module may be operable to enable the first and second exit options simultaneously. The voice module may be operable to enable the first and second exit options in a temporally overlapping manner.

The voice module may include a speech recognition engine operable to recognize the voice commands spoken by the user in both of the data entry modes and the navigation modes.

A navigation command spoken by the user may include one of a plurality of verbal commands associated with one of a plurality of elements in the voice-enabled user interface, receipt of which initiates accessing the associated interaction element. The voice module may receive one of the plurality of verbal commands associated with one of the plurality of interaction elements and identify an element in the voice-enabled user interface to be accessed, the identified element being associated with the received verbal command.

A navigation command spoken by the user may include a verbal command common to a plurality of elements of the voice-enabled user interface which may be navigated to or from when in the navigation mode, where receipt of the verbal command initiates individual identification of each of the plurality of elements.

In another aspect, a command grammar for a voice-enabled user interface includes an explicit exit command grammar for receiving an explicit exit command from a user for exiting an open interaction element in the voice-enabled user interface, the open interaction element being characterized by an ability to accept multiple data entries when in a data entry mode. The command grammar also includes an implicit exit command grammar for receiving a navigation command from the user for navigating to or from one of a plurality of elements in the voice-enabled user interface associated with the received navigation command. Receipt of the navigation command initiates exiting from the open interaction element and entering a navigation mode associated with navigating to or from one of the plurality of elements.

Implementations may include one or more of the following features. For example, the command grammar for a voice-enabled user interface may further include a time-out grammar for detecting a pause in speaking of the user. The pause may be characterized by a passing of a pre-determined period of time, and resulting in initiating an exit from the open interaction element.

The command grammar for a voice-enabled user interface may further include a tab grammar for receiving a verbal command common to a plurality of elements in the voice-enabled user interface. Receipt of the verbal command may initiate a tabbing functionality between the open interaction element and a designated one of the plurality of elements.

The command grammar for a voice-enabled user interface may further include an all elements grammar for receiving a verbal command common to a plurality of elements of the voice-enabled user interface which may be navigated to or from. Receipt of the verbal command may initiate an identification of each of the plurality of elements.

In another aspect, an open interaction element is output in a voice-enabled user interface. The open interaction element is characterized by an ability to accept multiple data entries when in a data entry mode. Data for entry into the open interaction element is received. A first exit option and a second exit option from the open interaction element for use by the user are enabled, to thereby allow the user to switch from the data entry mode to a navigation mode associated with navigating to or from elements in the voice-enabled user interface. The first exit option is characterized by receipt of an explicit exit command spoken by the user, and the second exit option is characterized by receipt of a navigation command spoken by the user.

Implementations may include one or more of the following features. For example, a third exit option from the open interaction element for use by the user may be enabled. The third exit option may be characterized by an automatic transition from the data entry mode to the navigation mode after a passing of a pre-determined period of time.

Additionally, a third exit option from the open interaction element for use by the user may be enabled. The third exit option may be characterized by a verbal command common to a plurality of elements in the voice-enabled user interface, receipt of which initiates a tabbing functionality between the open interaction element and a designated one of the plurality of elements. One or more exit options may be simultaneously enabled.

The navigation command spoken by the user may include one of a plurality of verbal commands associated with one of a plurality of elements in the voice-enabled user interface. Receipt of the verbal command may initiate accessing the associated interaction element. The navigation command spoken by the user may include a verbal command common to a plurality of elements of the voice-enabled user interface which may be navigated to or from when in the navigation mode. Receipt of the verbal command may initiate an identification of each of the plurality of elements.

The details of one or more implementations are set forth in the accompanying drawings and description below. Other features will be apparent from the description and drawings, and from the claims.

DESCRIPTION OF DRAWINGS

FIG. 21 is an example of a voice-enabled user interface including open interaction elements.

DETAILED DESCRIPTION

A user interface to a software application or an electronic device may be improved by voice-enabling user interactions and data entry. Voice-enabled software applications may provide increased usability and efficiency for a user. Additionally, voice-enabled software applications may provide increased accessibility for physically disabled users.

Figure 1:
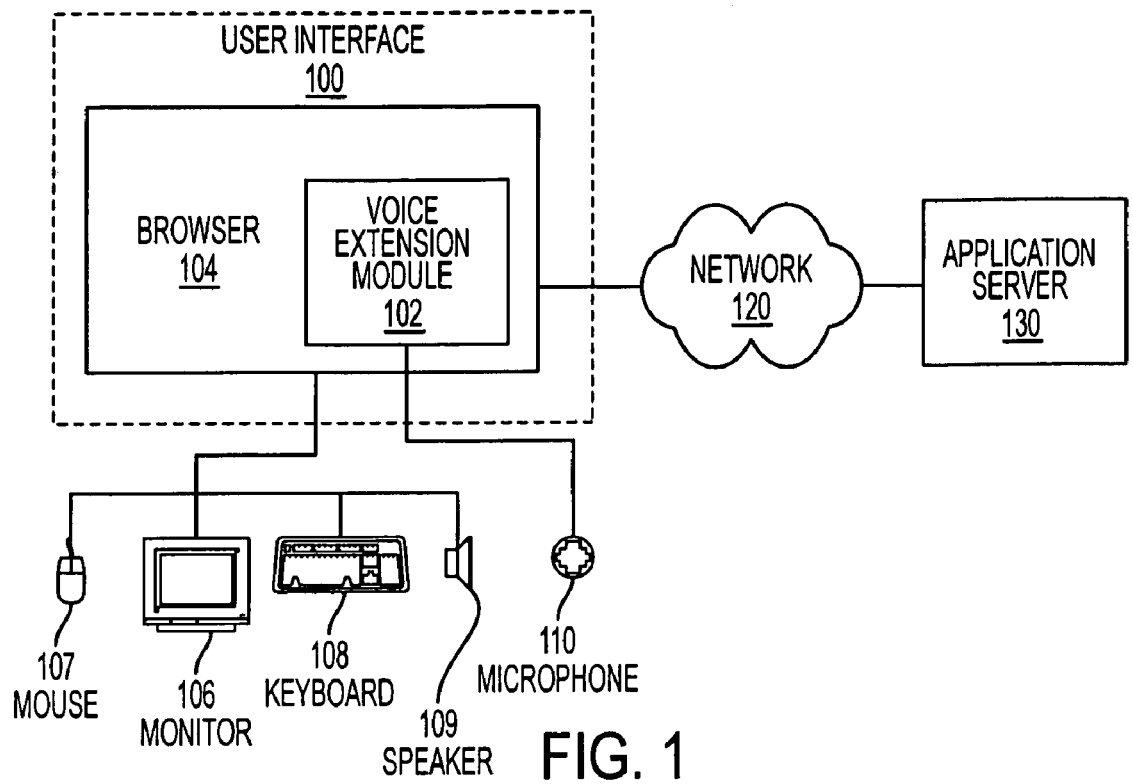
FIG. 1 is a block diagram of a voice-enabled computer application using a voice extension module.

Referring to FIG. 1, a voice-enabled computer interface 100 includes a voice extension module 102 and a browser 104. The browser implements the user input and output functionality, for example, using the following devices: a video display monitor 106; a mouse 107; a keyboard 108; and a speaker 109. The voice extension module 102 may receive input from a microphone 110. The browser 104 and/or the voice extension module 102 may receive user interface data across a network 120 (e.g., the Internet) from an application server 130.

In the implementation shown in FIG. 1, application server 130 provides a web-enabled user interface using Hypertext Markup Language (HTML) code to instruct browser 104 to display information and accept user input and commands. Browser 104 may be implemented using a conventional web browser, such as Microsoft® Internet Explorer™. Application server 130 sends HTML code describing various text, images, and user interface widgets to be displayed to the user. The HTML code, however, is first received and processed by voice extension module 102 to make the application voice-enabled.

A voice extension module 102 may be implemented as a Microsoft® Internet Explorer™ Browser Helper Object (BHO). A BHO acts as an extension of functionality to a browser and is used to intercept page and browser events before action is taken. This allows the voice extension module 102 to define and control the behavior of the browser 104 environment and the way in which events (e.g., mouse clicks, key presses) are handled. In addition, a BHO allows the voice extension module 102 to respond to external events, such as when a word is spoken, by embedding a speech recognition engine into the BHO. In this implementation, any speech recognition engine (e.g., a SAPI-compliant speech recognition engine) may be used to generate speech recognition events.

Figure 2:
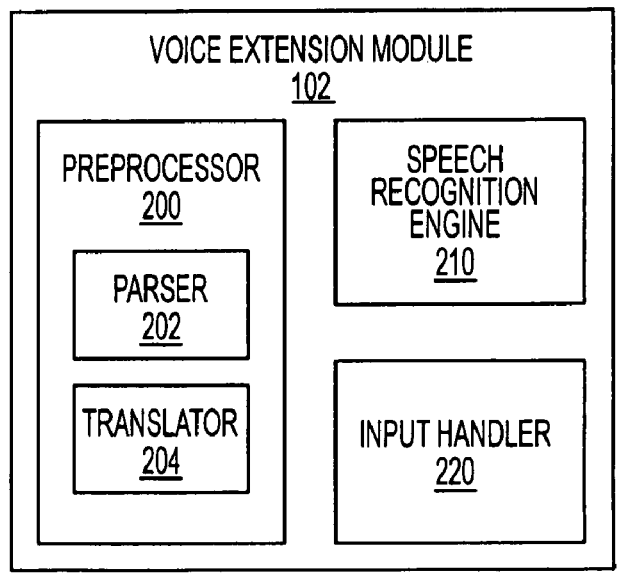
FIG. 2 is a block diagram of a voice extension module having a preprocessor, speech recognition engine, and input handler.

As shown in FIG. 2, one implementation of voice extension module 102 includes a browser 104 (with a preprocessor 200) that receives user interface information from an application server 130, for example, as HTML or JavaScript™ code, and preprocesses the user interface information to enable voice interaction before the page is displayed to the user. The preprocessor 200 includes a parser 202 and a translator 204. The parser 202 identifies user interface elements within the code using any conventional parsing techniques, such as, a finite state machine.

For example, user interface information in the form of an HTML web page may include various widgets in the form of text fields, password fields, checkboxes, radio buttons, and control buttons (e.g., submit and reset), referred hereto as "interaction elements" or "element". The parser 202 receives the user interface information and passes it to the translator 204 to properly register the relevant vocabulary with the speech recognition engine 210 and the input handler 220.

The translator 204 determines which of the identified user interface elements are "speakable." A vocabulary of speakable items is registered with the speech recognition engine 210 so that appropriate events are generated when the items are spoken. Additional changes may be made to the HTML or JavaScript™ running within the browser 104 before it is presented to the user, in order to make the pages more "voice-friendly." For example, translator 204 may add identifiers to interaction elements. Some interaction elements may include XML data or other metadata that indicates an appropriate voice identifier for the interaction element. This metadata may determine an appropriate identifier that may be added to the element to make it more voice-friendly. Additionally, some identifiers may be abbreviated. For elements containing abbreviated identifiers, translator 204 may register the abbreviated identifier, the long form of the identifier, or both with the speech recognition engine 210. Finally, translator 204 may attempt to shorten long identifiers. One way to shorten long identifiers is to register only a portion of the long identifier. For example, if the identifier is "Submit Changes for Processing," it can be shortened to "Submit" or "Submit Changes."

Once a registered vocabulary item is spoken and recognized, the phrase is sent to input handler 220 which takes the appropriate steps to complete the action, save any necessary state, and perform additional tasks as defined by the behavior of the voice user interface or visual focusing used in the overall voice interface strategy. The input handler 220 helps to ensure that the same action is taken regardless of whether the source was the mouse or keyboard, or an equivalent voice command.

Figure 3:
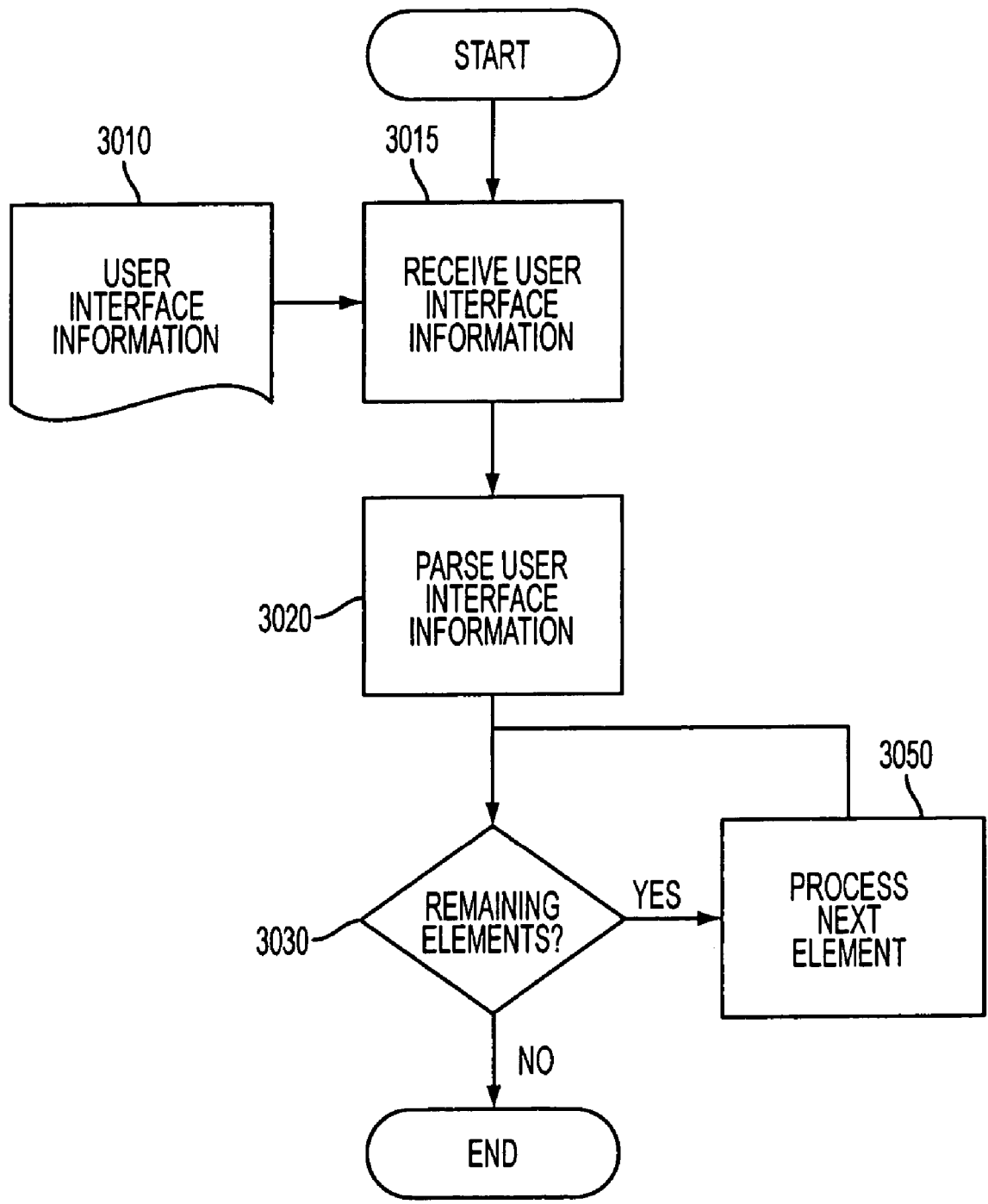
FIG. 3 is a flowchart showing a method of processing user interface information in a voice extension module.

Referring to FIG. 3, voice extension module 102 makes a user interface voice-enabled by first receiving user interface information 3010 describing the components of the interface able to be manipulated by a user (step 3015). In this implementation, user interface information 3010 is represented as an HTML document that may include various user interface elements or widgets that may be controlled by a user. The user interface information 3010 also may include JavaScript™ code or any other control mechanism conventionally used by web browsers.

The user interface information 3010 is received by voice extension module 102 and then processed by preprocessor 200. The preprocessor 200 parses the received user interface information 3010 using parser 202 (step 3020). For each user interface element identified by parser 202, translator 204 processes the element to make it voice-enabled. As long as user interface elements are remaining (step 3030), the system processes the next element (step 3050). Once each user interface element has been processed, the user interface is displayed by the browser 104. Translator 204 processes each user interface element by registering appropriate vocabulary with the speech recognition engine 210 and by registering the user interface elements with input handler 220.

For example, the following user interface element may be received by voice extension module 102: "<INPUT TYPE='button'NAME='but_xyz'VALUE='save changes'>". This user interface element displays a button allowing a user to initiate saving changes. The translator 204 processes this element by registering "SAVE CHANGES" with the speech recognition engine 210. This would also be registered with the input handler 220 as a button field so that a user may access the field by stating "BUTTON." The input handler, receiving a button request, identifies all active buttons, allowing the user to select the desired button by number. This allows an alternate technique to access a named button element; however, this technique may be the only way to access unnamed button elements.

Data entry tasks incorporate many elements (or widgets) that require user control. Data entry is usually handled using a mouse and/or keyboard, and the intended target is generally easy to determine through the physical interaction component of the pointing device. In a voice interface, other focusing and selection techniques must typically be used to determine potential targets.

Many data widgets within applications, such as scroll bars, buttons, and text fields either do not have names (also referred to as unnamed elements, e.g., because they are associated with a particular unnamed table or row), have ambiguous names (e.g., because there is more than one field labeled as "ID number"), or appear to have names in the visual display, but are not easily associated with those names by the code, because the text appears in a completely different module from the widget.

One technique is to use implicit scoping in conjunction with a generic method for addressing data entry widgets. Implicit scoping is described in the following publication: James, F. and Roelands, J., Voice over Workplace (VoWP): Voice Navigation in a Complex Business GUI. *ASSETS* 2002, (Edinburgh, Scotland, 2002). Briefly, implicit scoping prioritizes screen areas to minimize the potential for ambiguity. A user interface screen may be divided into several areas that are prioritized. User interactions and screen updates modify the prioritization to make user interfaces more voice-friendly.

Generic access to interface elements is provided by addressing elements by type. For example, to reach a text field in a given application, a user simply says "text field." If there is more than one text field in the current focus area, this is treated as any other ambiguity; overlaid labels are presented to allow the user to select the intended target. Although this approach makes most element selection into a two-step process, it does allow the user to navigate to any element on the screen efficiently. If the user does not wish to select one of the overlaid elements, the user may dismiss the icons by saying "cancel." Items that can be accessed by name (such as buttons) also may be accessed using this generic method, to ensure interface consistency and allow for alternatives in the case of degraded recognition performance.

Once an item has been selected, if it is an icon, button, radio button, or check box, the interface behaves as though the item has been clicked with the mouse. For combo boxes, the options in the list are displayed so that the user can make a selection. Text fields are highlighted with a colored border and the active cursor is placed in them, to signal that the user has entered data entry mode for that field.

An alternative solution to handling unnamed elements is to add unique names to all the elements when the page is first presented to the user, rather than requiring the user to first say the element type to cause the numbered overlaid labels to appear.

One problem associated with voice interfaces is distinguishing data entry from commands. For example, when a user selects a multi-line text field, it can be assumed that the user wishes to enter data entry mode and input some text. However, a technique to determine when that input is finished and the user is ready to resume navigation is needed. This may be accomplished in many ways.

For example, one option is to use an explicit exit command to end data entry. This requires the use of a code word or phrase, such as, "end data entry." For multi-line text fields where the user will want to have full edit control, this may be the best solution since large data entry tasks of this nature would then be treated as a separate mode that has to be manually exited.

A variant of this idea is to have the system listen for multiple keywords, such as the names of other targets in the interface. One way to accomplish this is to employ multiple parallel recognizers, with each recognizer listening for different keywords. This technique, referred to as "implicit exit," however, increases the chance of misinterpreting data entry as a command and prematurely exiting data entry mode.

Similarly, a pause or timeout may be used to end data entry. Unfortunately this technique is often difficult for users because the end of data entry may be triggered by simply pausing to think about what to say next. This technique may be made more usable by providing visual cues to users.

Another option is to assign appropriate grammars to fields, to eliminate the need for dictation whenever possible. This technique is useful in situations where the field is expecting something specific, such as a date. However, it requires a way to determine the field's expected data type and the format for which the application expects the data to be presented. It will then need to assign a suitable grammar, potentially from a pool of common grammars, and also determine the appropriate formatting to be applied before entering the data into the element. Then, the system can automatically set the interface to expect to hear a particular type of entry once the field is selected, and return to the standard control mode once an entry is made.

A recognition grammar for a text field may also be chosen at run-time by the user using a method of "sticky grammar defaults." For example, the first time a user encounters a field, he can specify that a date grammar should be used. Then, on subsequent accesses of that field (even during different sessions), the system can default to the date grammar when the user is interacting with the same user interface element. In some implementations, sticky grammar defaults are saved as a file on the local computer independent from the source document, in much the same way that a browser may store websites visited, usernames, passwords, and other data. In one exemplary implementation, the file may be distributed to other users.

The sticky grammar method described above relies on the use of predefined grammars to improve speech recognition. A grammar is a specification of words and/or expected patterns of words to be listened for by a speech recognizer. For example, a date grammar may specify a month followed by a day followed by a year. A grammar for a combo box may include the options selectable in the combo box and, perhaps, some control phrases. By using grammars, the accuracy and efficiency of voice input increases significantly. This is because it is much easier to recognize which of ten words was spoken, rather than to determine which of thousands (or tens of thousands) of words was spoken.

Sticky grammars may be selected by a user and stored in a manner accessible by the voice extension module or browser. Sticky grammars may also be extended to support group, site, or global defaults for a given set of applications. For example, one user at a site could visit each web page to be regularly used at that site, choosing the appropriate grammars for user interface elements. The chosen grammars then may serve as sticky grammar defaults for future users.

The sticky default grammar for an interface element may also be chosen based on data entered into the user interface element. This can reduce the burden on users to individually tailor each screen. For example, if a particular application requires that a certain text field should read "Customer Name," then a specific input grammar for this field may be specified and provided as a sticky default. Regardless of the method used to determine when input will end, visual cues may be used to indicate to the user what mode he or she is in, and, perhaps, the expected grammar. For example, a blue border may be placed around the text field once it has been selected to indicate to the user that the system is expecting an entry for that field. Not only does this confirm the user's selection of a particular field, it also reminds the user that he or she must supply data for the field as the next action.

Different visual cues may also be used to provide an additional indication to the user that the data field is of a particular known type. For example, when a user interacts with a text box, the border color around the data field may be blue when a date field is encountered or green when a free text dictation field is entered. This could help the user by indicating the expected data type or format, when using sticky defaults. Additional commands may be available to the user to change the sticky default for a given field. A dialog box or other interaction methods may then be used to inform the user of what data types are available and to allow them to choose the most appropriate.

Figure 4:
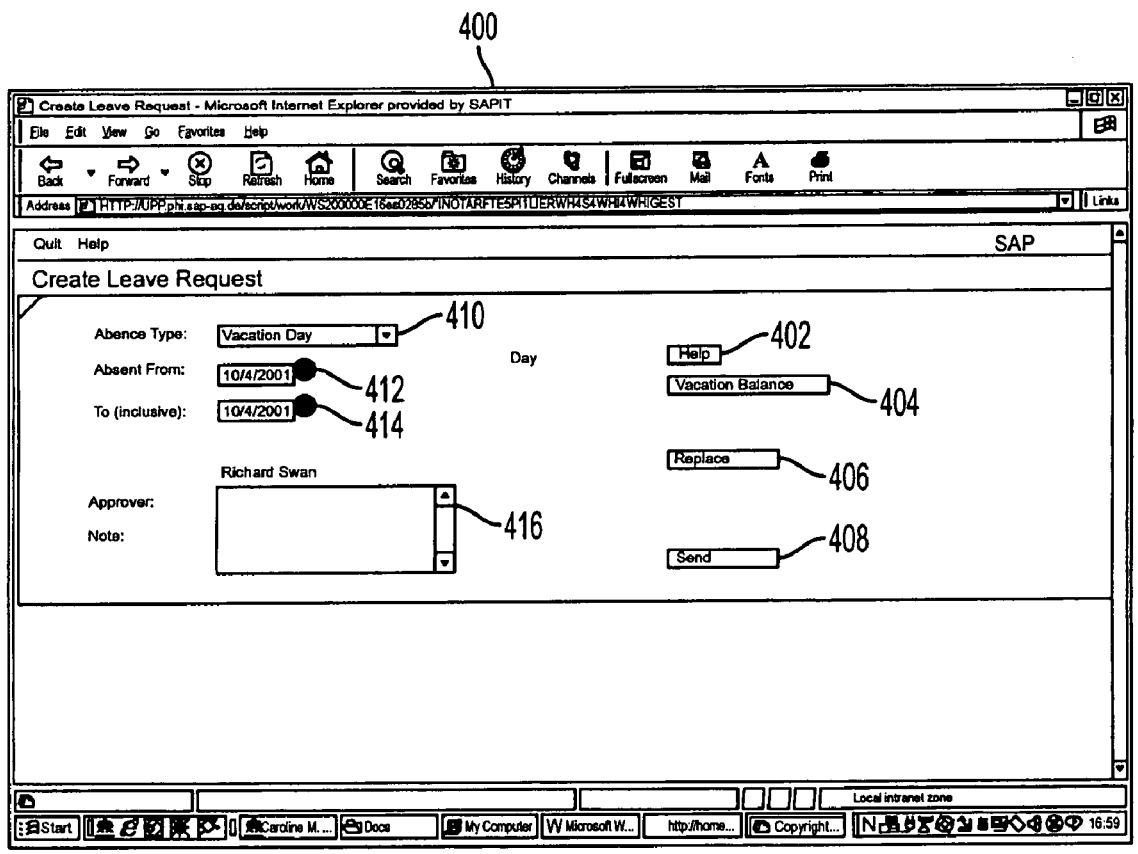
FIG. 4 is a screenshot showing a leave request application.

FIG. 4 illustrates an exemplary business application user interface to a leave request application using the techniques described above. The buttons on screen 400 (help button 402, vacation balance button 404, replace button 406, and send button 408) may be activated by speaking their names. Ideally, the remaining user interface elements also would be accessible by stating their names; however, it is often difficult or impossible to associate the appropriate text with the interface element. For example, remaining fields (absence type field 410, absent from field 412, absent to field 414, and note field 416) may include embedded labels or names that differ from text placed near the fields. The note field 416, for example, may be defined using the following HTML code: "<TEXTAREA NAME='ABNOTE' ROWS=4 COLS=20>". Sometimes it is not possible to associate a field with a label on the screen just by parsing HTML code. For example, it would be difficult for the system to associate the "Note" text with note field 416. In such cases, the creator of the web page can include XML or other metadata so that the system can determine an appropriate voice identifier for the field.

The absence type field 410 uses a drop-down list (combo box) for data entry. To focus on this particular item, the user says "combo box." This in general will number all combo boxes with transparent overlays to allow user selection. Since there is only one combo box in this screen, focus is automatically moved to it. The list is highlighted and the available choices are displayed. The default will be for the system to interpret the next command as an option from the list.

The absent from field 412 and absent to field 414 are both basically text fields that have associated info buttons allowing selection from another widget, in this case, a calendar. If the user wants to enter text into these fields, he can say "text field." This will cause transparent overlays (that include an identifiable character or number) to be displayed for all three text fields: the two text fields related to dates and also the text field for notes. The user selects a number to choose the desired field. At this point, the text field will be in focus and the user can dictate the appropriate date.

The note field 416 may be similarly activated using voice commands; however, the text area also includes a scroll bar. Thus, when note field 416 is activated, a scroll bar voice command is available allowing the user to scroll up and down within the activated note field 416.

Figure 5:
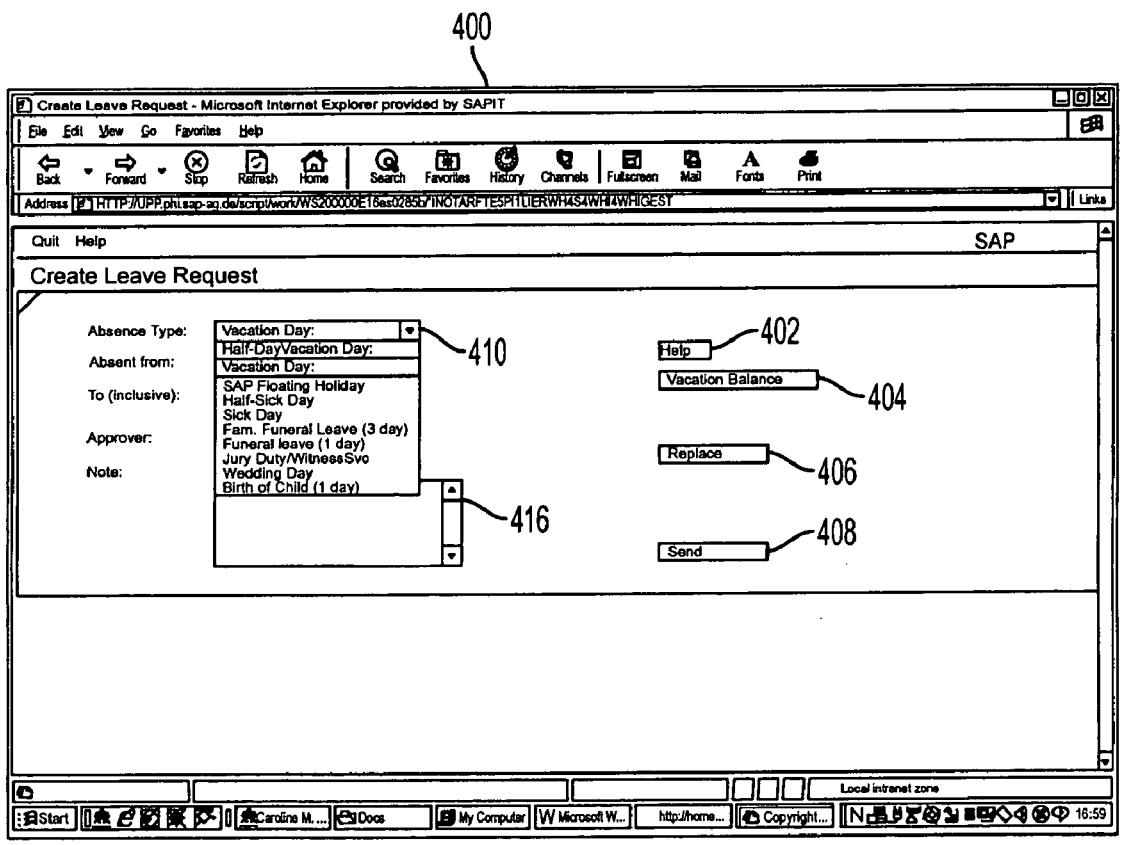
FIG. 5 is a screenshot showing a leave request application illustrating list selection.

FIG. 5 illustrates screen 400 after the user says "combo box." The field is activated with a visual cue, in this case, a blue box surrounding the field, and the available options are shown to the user. The user may then select an option by reading the displayed text. For example, the user may say "wedding day" or "sick day" to select the corresponding option.

The user may then enter dates in the absent from field 412 and absent to field 414 by saying "text field." This causes the three text fields to be numbered or otherwise highlighted on the screen so that the user may then select the desired text field. For example, the system may place a transparent overlay on the three text fields, with each overlay indicating a number. The user may then read the number to select the desired field.

The user may interact with the system to enter a date by saying "text field" and then "one" to shift the focus to the "absent from" field 412. Then, the user may indicate the date by saying "October Fourth Two Thousand One." The speech recognition engine 210 may use a date recognition grammar registered by translator 204 to recognize voice input. The translator 204 then formats the recognized numbers in the appropriate date format for use by the application.

Figure 6:
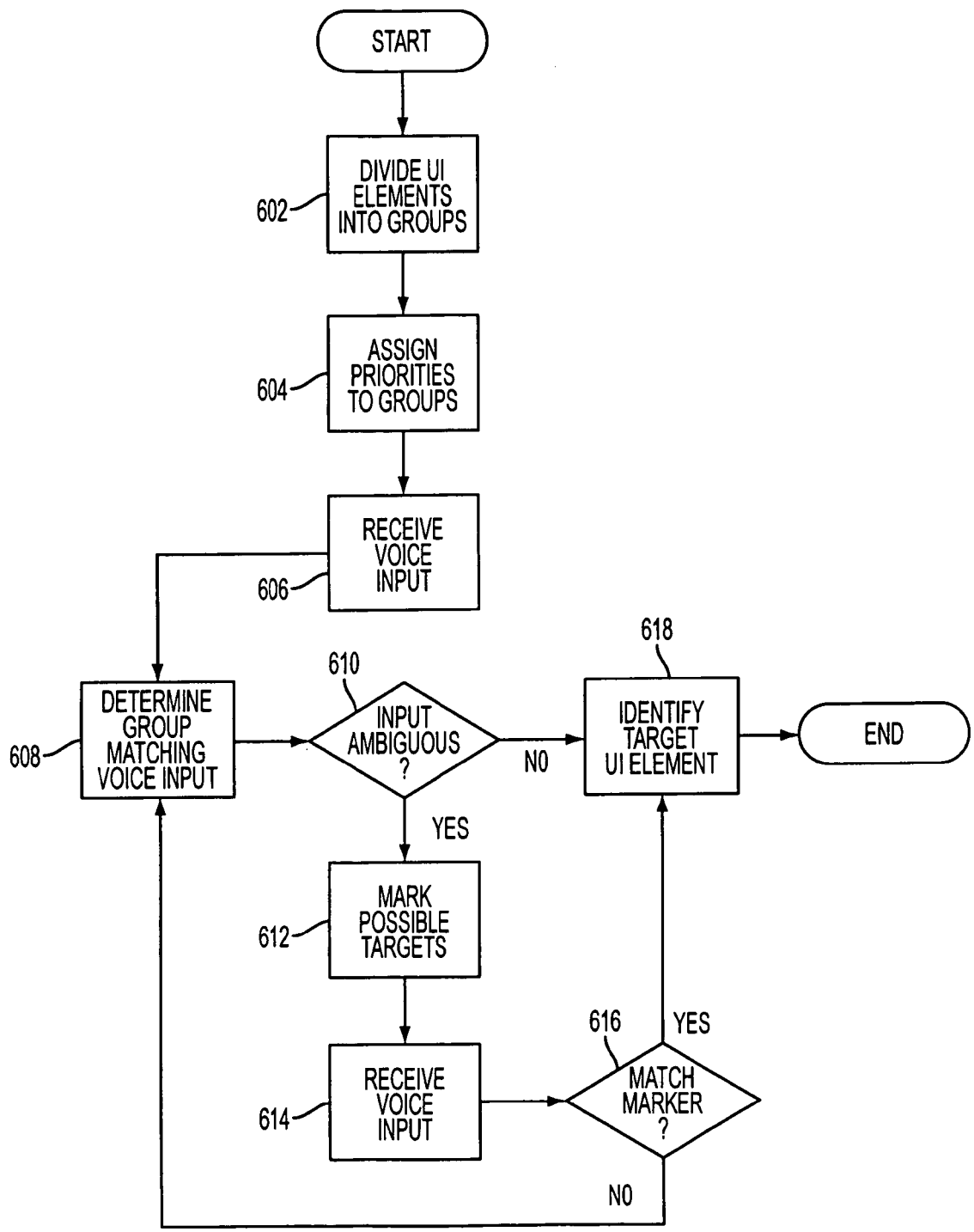
FIG. 6 is a flowchart showing the use of implicit scoping to resolve target ambiguities in a voice interface.

FIG. 6 illustrates a voice-enabled system. Complex voice-enabled applications sometimes have difficulty resolving ambiguities in a user's actions. In a physical interaction with a mouse or other pointing device, users specify the focus of their actions directly by clicking on the item of interest. In a voice-enabled application, it is not always easy to uniquely identify each user interface element. For example, a user interface may include multiple buttons labeled "Search" or multiple text fields with no easy identifiers. This ambiguity is sometimes referred to as target ambiguity because the target of a user's action is ambiguous and must be resolved.

The voice-enabled system uses three techniques to resolve target ambiguities: (1) visual cues identify the current focus area; (2) implicit scoping prioritizes screen areas to minimize the potential for ambiguities; and (3) representational enumerated labels allow users to resolve ambiguities explicitly. Individually, or in combination, these techniques, described in detail below, may reduce or eliminate target ambiguities in voice-enabled interfaces.

Visual cues include any visual indicator used to reduce target ambiguity. For example, a screen area or a user interface element may be highlighted, outlined, or otherwise visually identified as the preferred or expected target. Target ambiguities may then be resolved in favor of the screen area or user interface element indicated by a visual cue.

Implicit scoping reduces target ambiguities by dividing and prioritizing portions of the user interface. A complex user interface may include several components including a navigation bar, header bar, and one or more application screen areas. For example, a portal web page may include a navigation bar on the left side of the screen, a header bar at the top, and several application screen areas where each application screen area provides an interface for performing different tasks. The various screen areas may be implicitly scoped by prioritizing each area.

Screen area priorities may be explicitly stated by the developer of the user interface or they may be automatically chosen based on some heuristics. For example, screen areas may be prioritized in the following order: (1) the application screen areas prioritized from top to bottom, left to right; (2) the navigation bar; and (3) the header bar. Thus, target ambiguities between the navigation bar and the header bar are resolved in favor of the navigation bar. Similarly, ambiguities between the navigation bar and an application screen area are resolved in favor of the application screen area.

Finally, representational enumerated labels may be used to resolve ambiguities that cannot otherwise be resolved. Using this technique the voice-enabled interface identifies each possible target in response to user voice input. The possible targets are enumerated and identified to the user so that the user may select the desired target. For example, if three text fields are possible targets, the targets may be numbered "1," "2," and "3." The numbers are indicated in the interface so that the user may then choose which text field is the desired target.

The representational enumerated labels may be semi-transparent overlays placed over the corresponding user interface elements. Using semi-transparent overlays allows the voice-enabled interface to identify the potential targets without substantially affecting the presented interface, as users may view the underlying interface information through the semi-transparent overlay.

Referring to FIG. 6, implicit scoping may be implemented by dividing user interface elements into one or more groups (step 602), such as, for example, screen areas. Each group is assigned a relative priority to be used in resolving ambiguities (step 604). For example, each group may be assigned a number from one to ten with one being the highest. Only those user interface elements from the highest possible group is used. Thus, ambiguities may be at least partially resolved by ignoring lower priority groups of user interface elements.

The voice interface receives a voice input (step 606) and determines the highest priority group with targets matching the voice input (step 608). If ambiguities still exist in the highest priority group with a match (step 610), the system marks possible target user interface elements (step 612). Ambiguities may still exist, for example, if the voice input is "text field" and multiple text fields exist in the highest priority group. Additional voice input is received by the system (step 614). If the voice input matches one of the marked possible target user interface elements (step 616), then the target is identified (step 618) and the process ends.

If the additional voice input does not match one of the marked target user interface elements (step 616), then the system checks to see if input matches another user interface element (step 608). If the input is not ambiguous (i.e., uniquely identifies a user interface element in the highest priority group with a match), then the target user interface element is identified (step 618) and the process ends.

Figure 7:
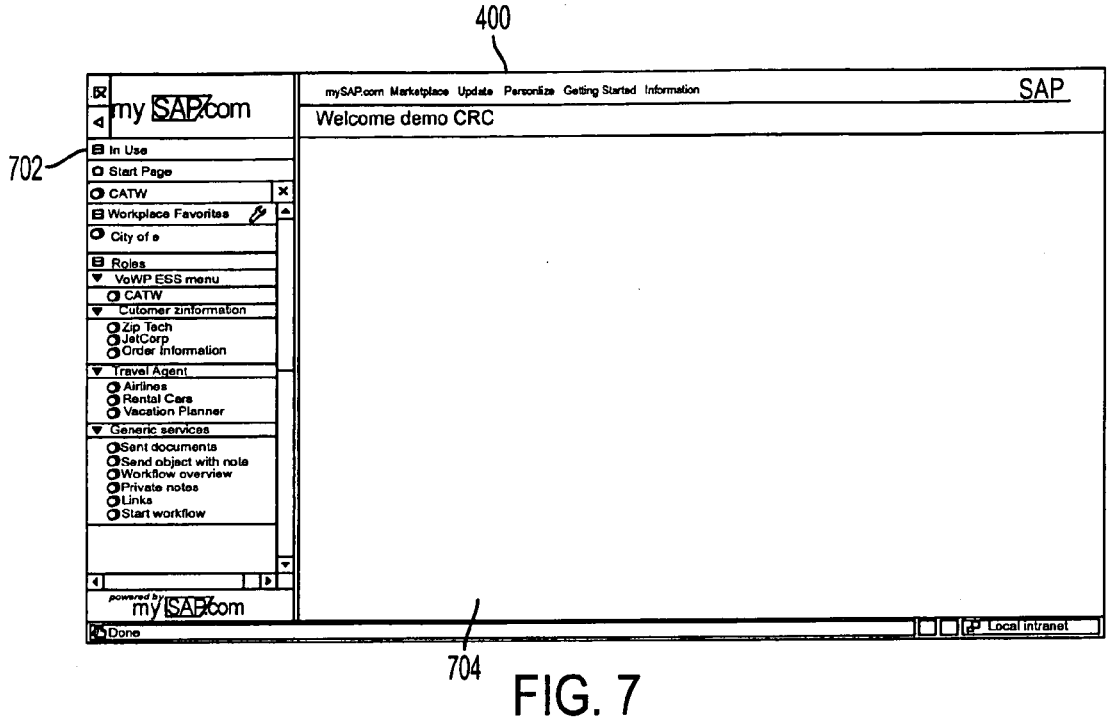
FIG. 7-18 are screenshots of a voice-enabled electronic timekeeping system using implicit scoping, visual cues, and representational enumerated labels to resolve target ambiguities.
Figure 8:
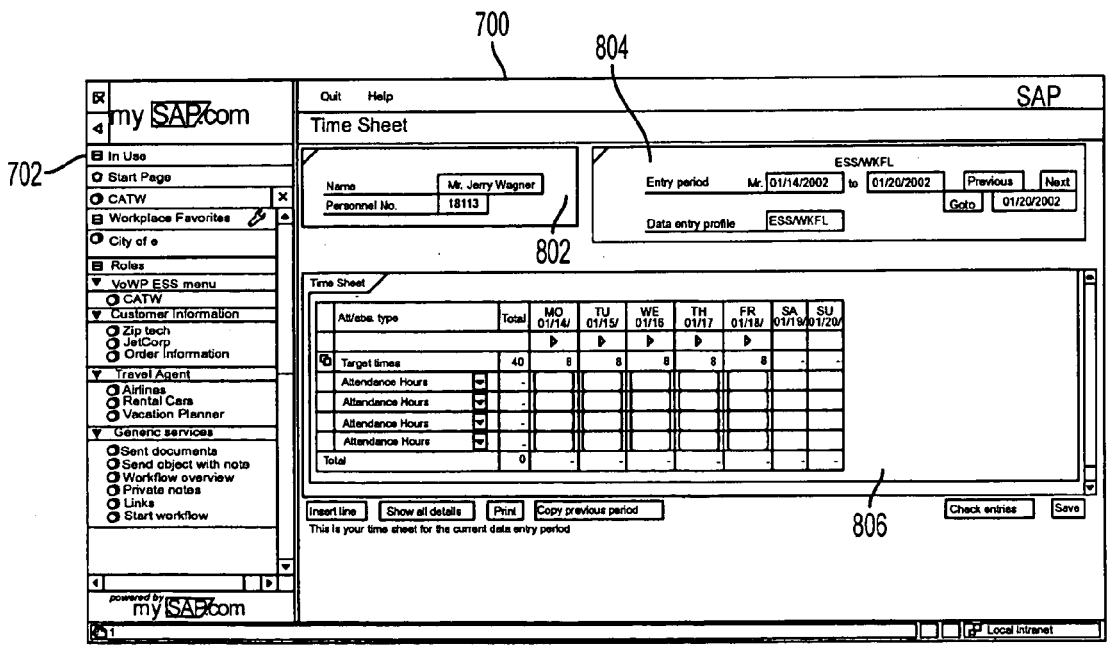

FIGS. 7-17 describe a voice-enabled electronic timekeeping application using visual cues, implicit scoping, and representational enumerated labels to resolve target ambiguities. In this implementation, the electronic timekeeping system is built on a web-based, client-server architecture. However, the described techniques are not limited to this implementation and may be used in any user interface. In FIG. 7, a web portal allows a user to select various applications. The application window 700 includes two screen areas: a menu area 702 listing the various applications and a display area 704. The menu 702 is subdivided into several areas including a "Roles" allowing a user to select tasks based on several indicated roles. The application begins with the focus area set to the "Roles" menu. The focus area may be indicated by a visual cue such as, for example, a colored line surrounding the focus area. The user may select to begin the electronic timekeeping application (named "CATW") by speaking "CATW." This command initiates the application using display area 704 as shown in FIG. 8.

Referring to FIG. 8, the electronic timekeeping application includes three general components that are displayed in display area 704. These components include the following: a user identification component 802, a time period component 804, and a time entry component 806. The user identification component 802 lists the user's name and personnel number. The time period component 804 lists the displayed time period and allows the user to switch to other time periods. The time entry component 806 allows a user to modify and/or enter time for the time period indicated by the time period component 804. The visual cue is moved to the display area 704 indicating that this area now has priority for ambiguity resolution and command interpretation.

The time entry component 806 includes what looks like a spreadsheet with columns indicating the days in the time period and rows indicating various categories of time entry, such as, for example, annual leave, attendance hours, business trip, compensation flex time, compensation overtime, education/training, family medical leave, holiday, jury duty, long term disability, meeting, personal time, severance pay, or short term disability. Various text fields corresponding to each row/column combination are available for data entry; however, no obvious mechanism is available for users to easily identify a desired target text field.

Figure 9:
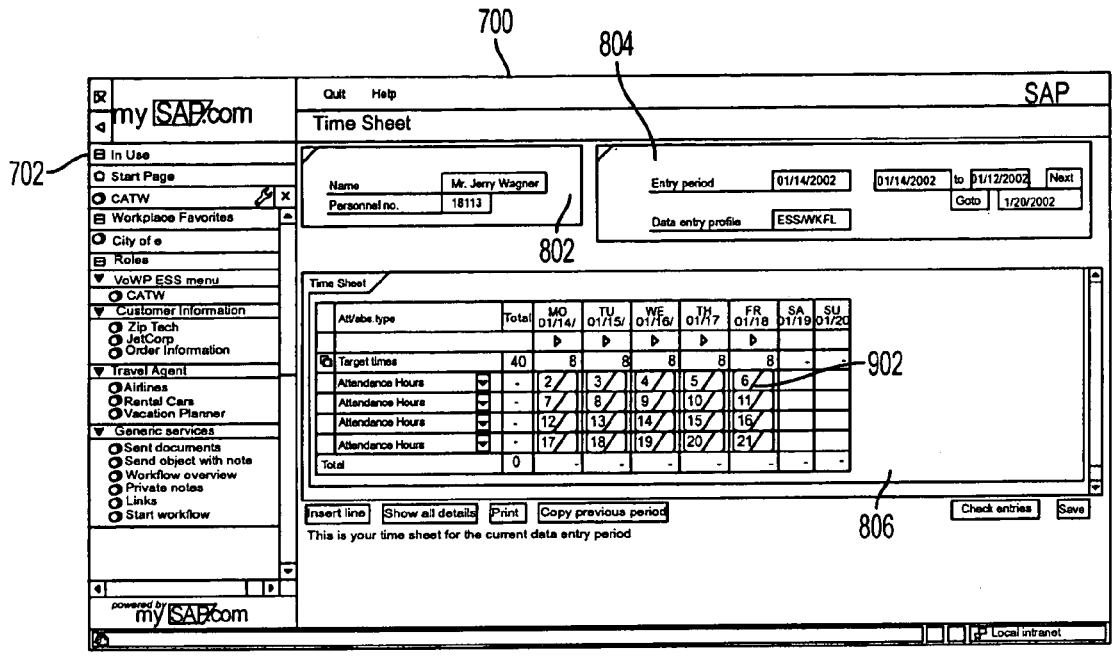

Referring to FIG. 9, a user desiring to enter text in the upper leftmost text field of the time entry component 806 may say "text field." The system may use a prioritization scheme for example to split the left-hand frame from the right-hand frame and only apply the representational enumerated labels to the right-hand frame containing potential target text fields. Because the system is unable to resolve the ambiguity using prioritization alone, each possible text field within the frame given priority is indicated by a representational enumerated label 902 (pointing to one of the 21 displayed representational enumerated labels). Label "1" is placed in the text field in the time period component 804. The remaining labels "2-21" are placed in the text fields of the time entry component 806. The user may identify the target text field by speaking its corresponding number.

Figure 10:
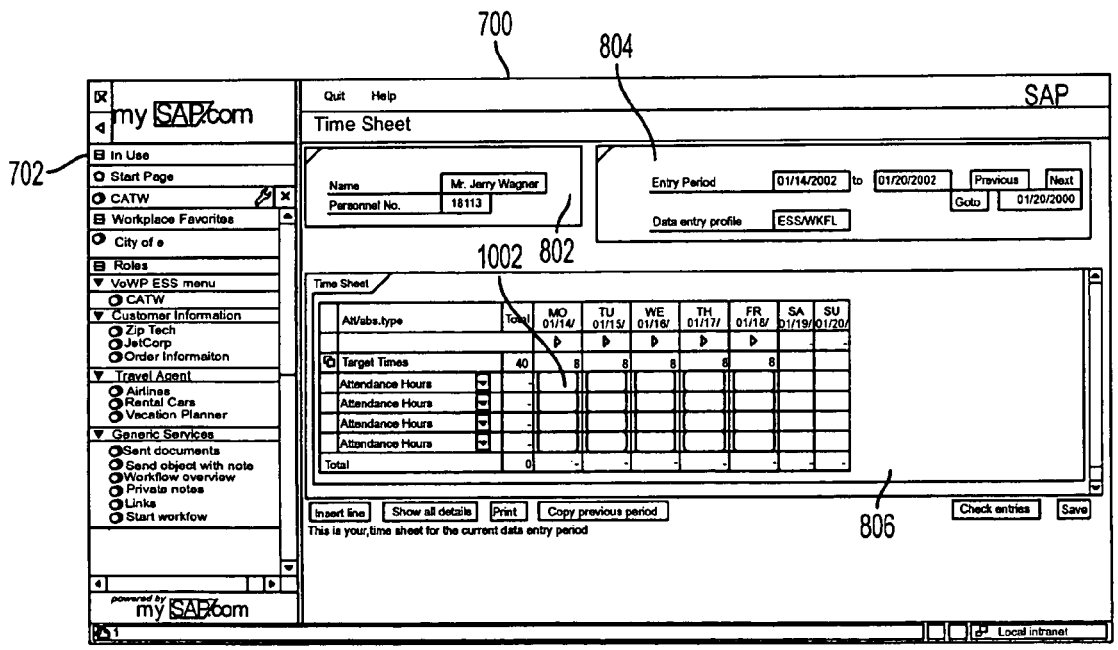

Referring to FIG. 10, the user selects the upper leftmost text entry field 1002 in the time entry component 806 by saying "two." After the user input is received, the representational enumerated labels disappear and the system prepares for data entry in the text field 1002 by entering a data entry mode. A blue outline serves as a visual cue to indicate to the user that the system is in data entry mode and will enter any data entry in the text field with the blue outline.

Figure 11:
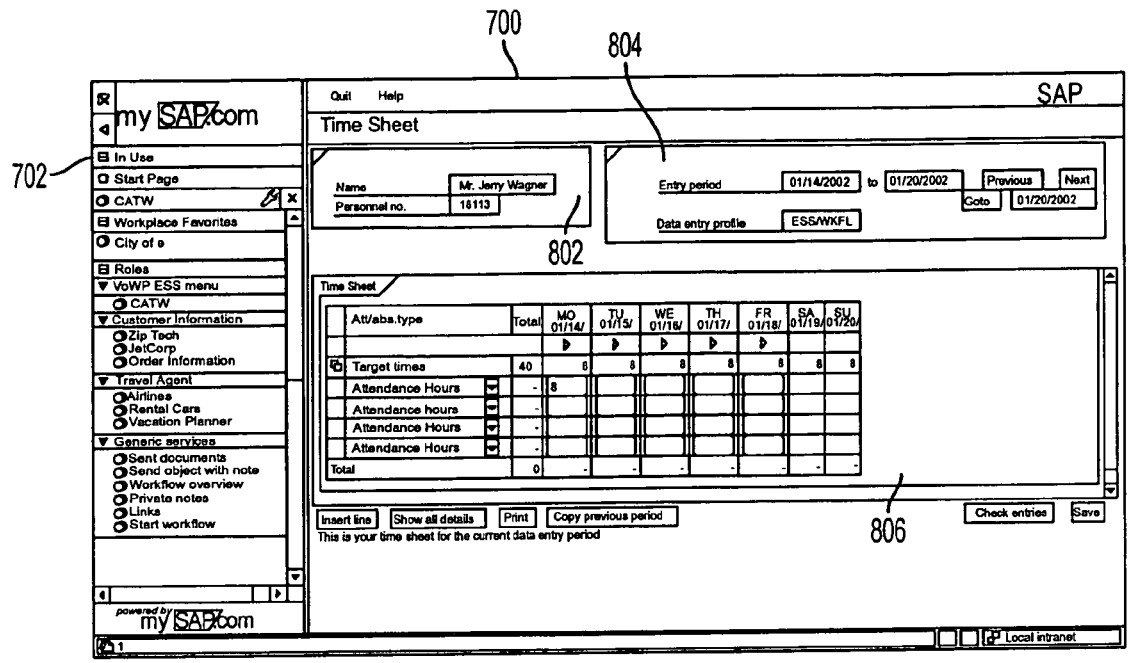

Referring to FIG. 11, in data entry mode, the system may use an assigned grammar to improve speech recognition performance. The electronic timekeeping application expects users to enter the number of hours worked in each text field of the time entry component 806, so a grammar may be assigned to those text fields that recognizes numbers. The user may then dictate the contents of the text field by saying the desired number. In this example, the user speaks "eight" and the system enters the number eight into the text field 1002 and exits data entry mode.

Figure 12:
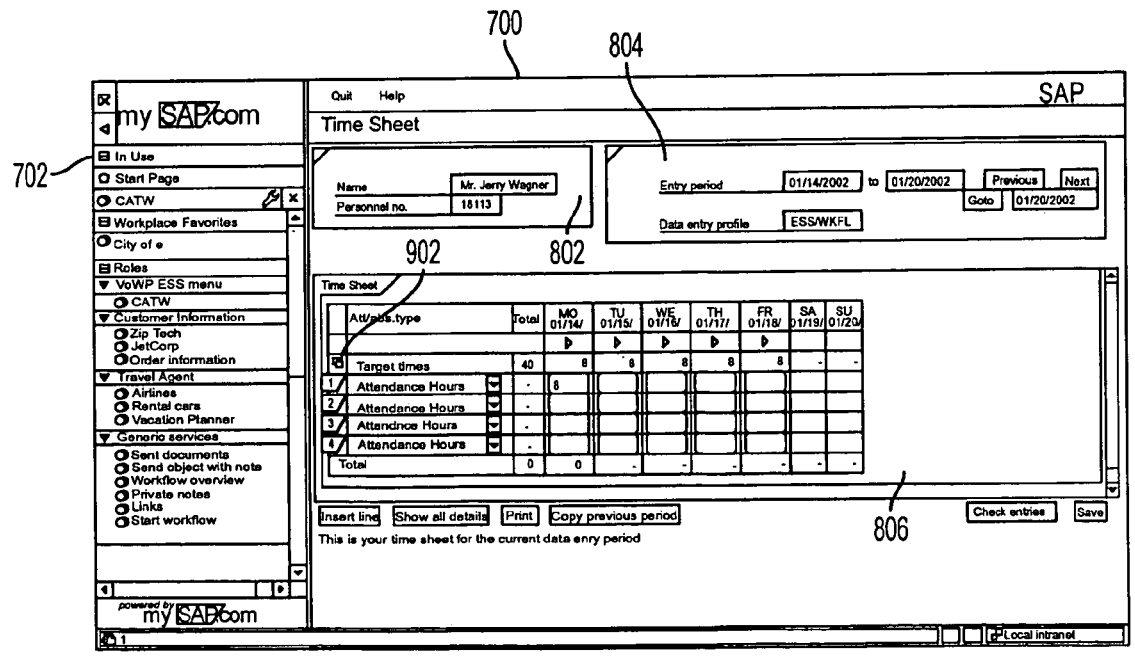

Referring to FIG. 12, a similar technique may be used to interact with the combo boxes used to select time categories in the time entry component 806. A user wishing to change a category from "Attendance Hours" to "Holiday" may do so by speaking "combo box." The request is ambiguous because there are four possible combo boxes available for data entry, so the system displays representational enumerated labels 902 to allow the user to resolve the ambiguity. The combo boxes are labeled one through four to allow the user to identify the desired target.

Figure 13:
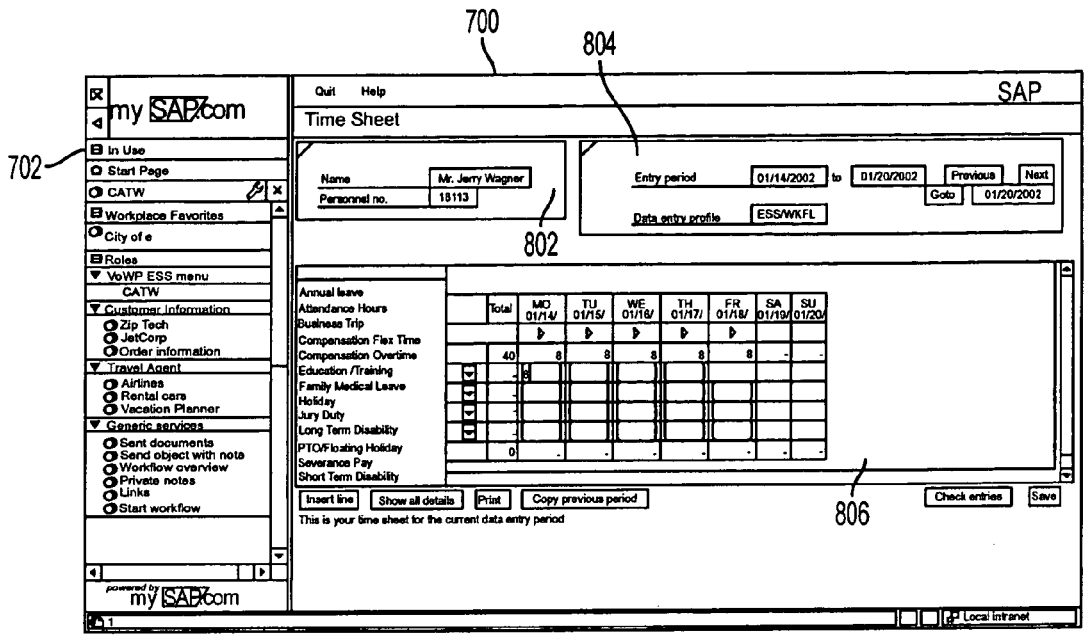

Referring to FIG. 13, the user selects a combo box by speaking the number of the corresponding representational enumerated label 902 (as shown in FIG. 12). In this example, the user speaks "two," the labels are removed, and the second combo box is opened for data entry, displaying the list of choices selectable by the combo box. The user may then select the desired choice by reading the desired choice.

Figure 14:
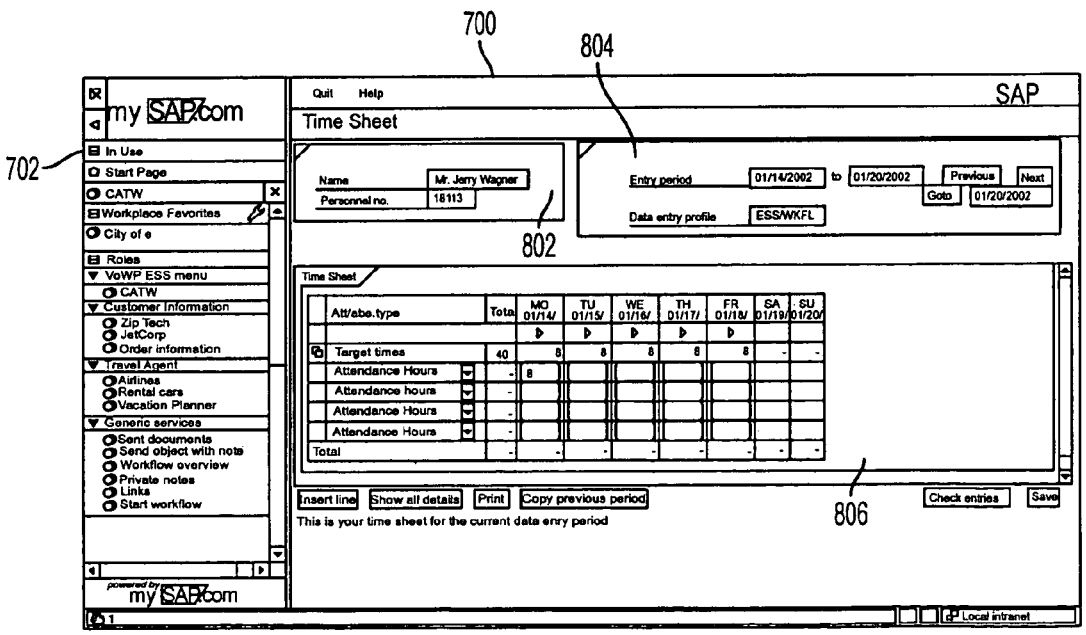

Referring to FIG. 14, the user makes a selection by saying "holiday" and the system updates the combo box value accordingly. The combo box then closes and focus is returned to display area 704. The user then may enter time corresponding to the newly selected time category using the technique described above with respect to FIGS. 9-11.

Figure 15:
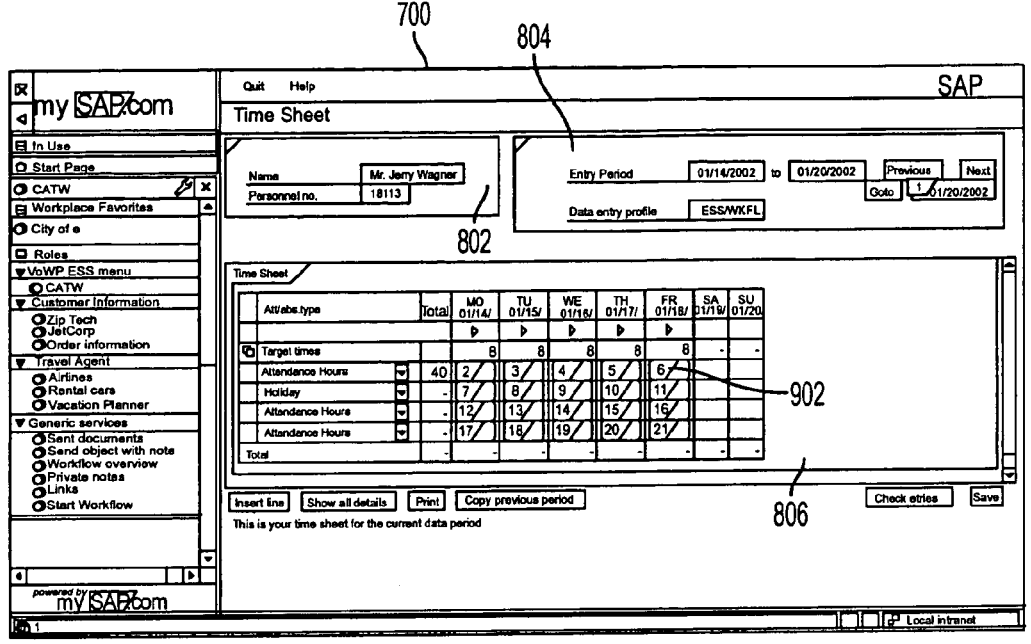

Referring to FIG. 15, the user says "text field" to enter time in time entry component 806. Because the target is ambiguous, representational enumerated labels 902 are displayed to allow the user to explicitly resolve any ambiguity. In this example, the user wishes to enter time in the holiday category for the second day.

Figure 16:
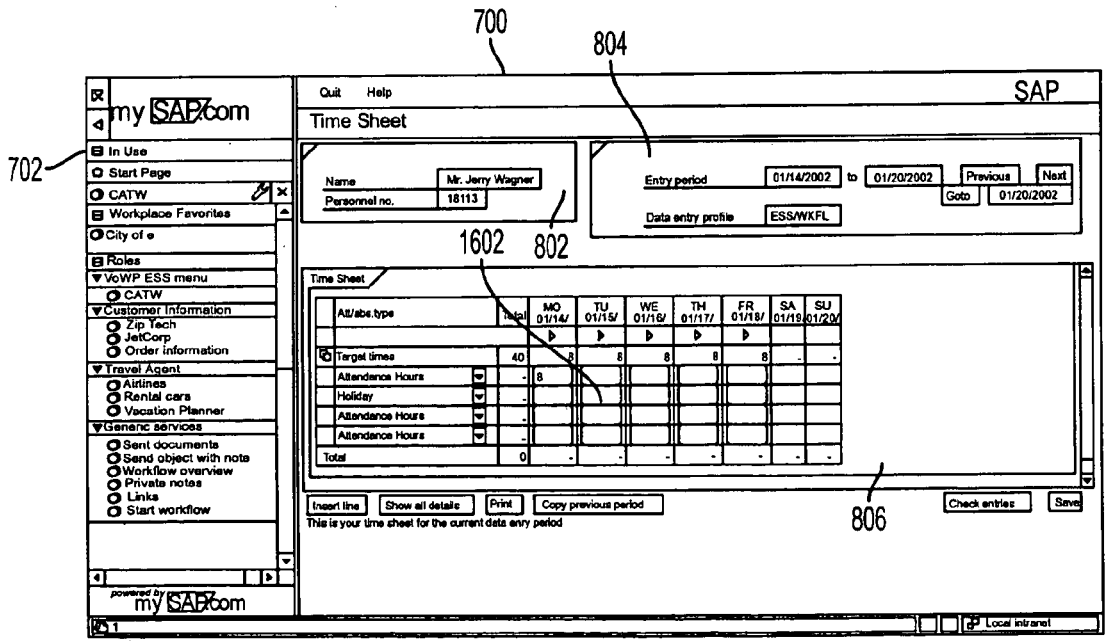

Referring to FIG. 16, the user says "eight" to identify the desired text field 1602 for data entry. The representational enumerated labels 902 are removed and focus is moved to the selected text field 1602. The system enters data entry mode and displays a visual cue so the user knows that data entry may begin.

Figure 17:
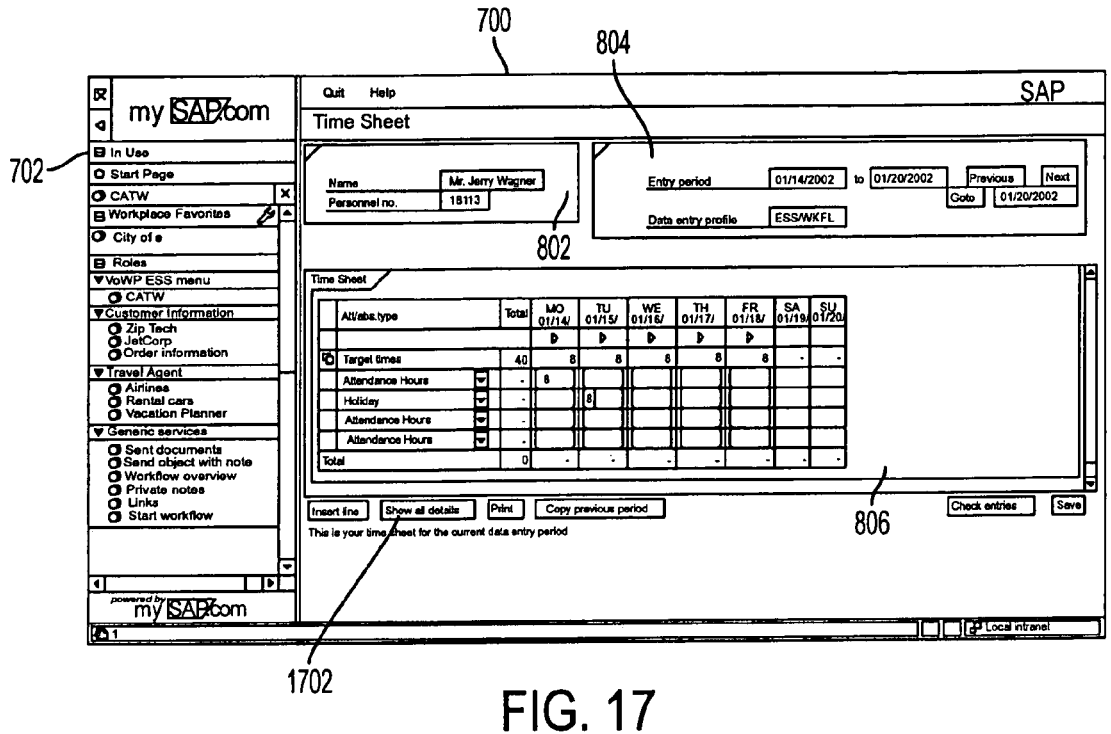

Referring to FIG. 17, the user then says "eight" to enter eight hours of holiday time on the second day of the time period. After the data is entered, the system exits data entry mode and focus is returned to display area 704.

Figure 18:
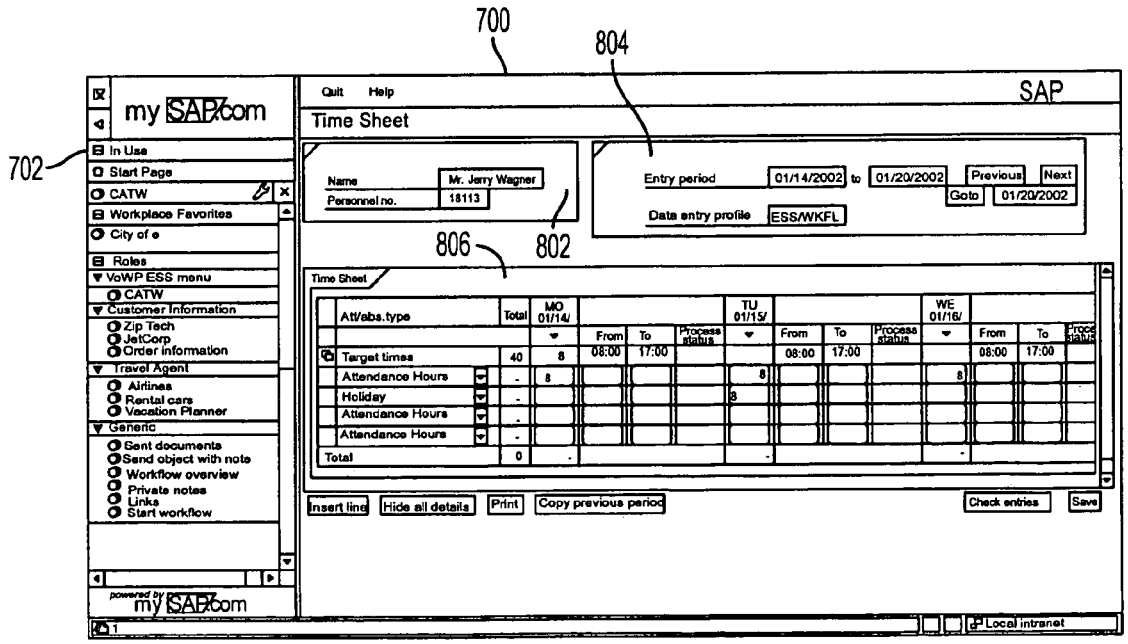

Referring to FIG. 18, the user may select buttons by reading their printed labels. For example, the user may say "Show All Details" to activate the corresponding button 1702 at the bottom of the display area 704. The system then displays detailed information as shown in FIG. 18. The user may return to the previous screen by saying "Hide All Details."

FIGS. 7-18 illustrate a voice interface for an electronic timekeeping system using visual cues, implicit scoping, and representational enumerated icons to improve user interactions with the system. The same techniques may be used to provide voice input and control in any graphical user interface.

As referred to above, when a user interacts with a single-select item, such as a combo box, radio button, or short entry text box, a voice interface can determine when the interaction is finished by waiting for the appropriate command and then exiting from the interaction with that item. For example, when a user selects a combo box, the interaction is complete when she says the name of one of the entries in the list and the entry is selected. Likewise, for a short entry text box (such as for a date), the interface can wait to hear a valid date, then enter that date and complete interaction with the text box.

However, many data entry items can support multiple selections, or may require dictation to enter an unconstrained piece of text. In these cases, the voice interface cannot easily determine when the user is done interacting with the data entry item simply by waiting for the appropriate entry to be made.

As a result, an interface design for determining completion with such elements, referred to as open interaction elements (OIEs), is described herein. The term OIE refers to the open-ended nature of the interaction with a multi-select or dictation item. In one implementation, the exit strategies and techniques described herein for exiting an OIE may be used in conjunction with the application and voice extension module of FIGS. 1 and 2, respectively. Additionally, the strategies and techniques may be used in conjunction with various other platforms and architectures, as well. In short, the OIE exit strategies presented herein may be generally used with any voice-enabled application that includes an interface having an OIE.

Figure 19:
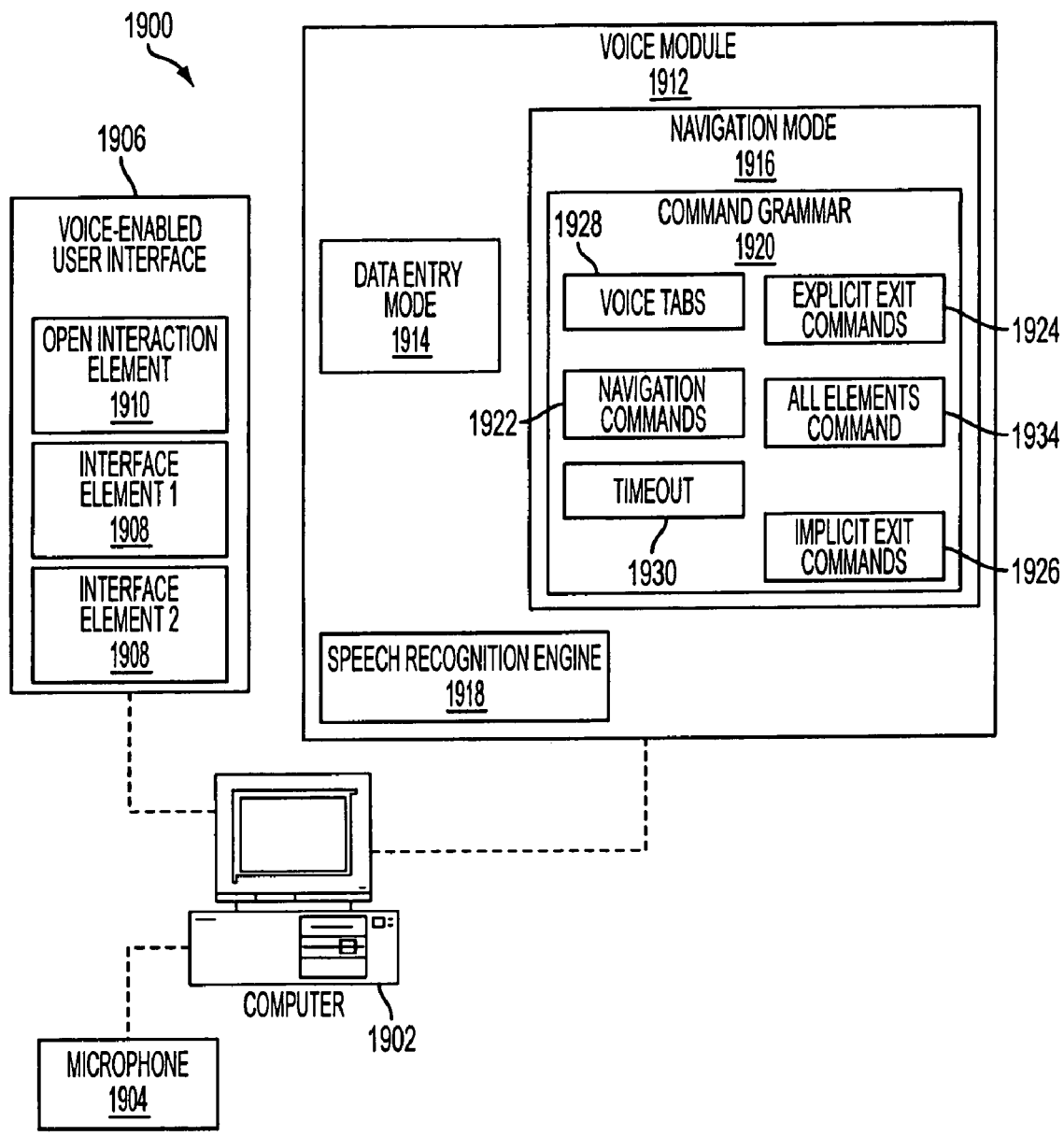
FIG. 19 is a block diagram of a voice-enabled system for accessing open interaction elements.

FIG. 19 is a block diagram of a voice-enabled system 1900 for accessing open interaction elements. The system 1900 includes a client computer 1902 and a microphone 1904 connected to the client computer 1902. The client computer 1902 accesses a voice-enabled user interface 1906. The client computer 1902 may be a general-purpose computer that is capable of operating as a client of the user interface 1906 (e.g., a desktop personal computer, a workstation, or a laptop computer running an application program), or a more special-purpose computer (e.g., a device specifically programmed to operate as a client of a particular application program).

In one implementation, the user interface 1906 may be similar to the user interface 100 depicted in FIG. 1, such as, for example, a web browser. The user interface 1906 includes interface elements 1908. The interface elements 1908 may include, for example, text fields, password fields, checkboxes, radio buttons, and control buttons (e.g., submit and reset).

Additionally, the user interface 1906 includes an open interaction element (OIE) 1910. The OIE 1910 may be, for example, a multi-select item or an item that accepts free-form text. In one implementation, the voice-enabled user interface 1906 receives voice input data spoken by a user using the microphone 1904 connected to the client computer 1902. For the sake of brevity, only one OIE 1910 is depicted in the system 1900, however, it should be understood that the system 1900 may be implemented with a user interface having multiple OIEs.

The system 1900 also includes a voice module 1912. In the illustrated implementation of FIG. 1, the voice module 1912 receives voice commands spoken by a user in at least a data entry mode 1914 and a navigation mode 1916. In one example, the data entry mode 1914 may be associated with data entry into an interface element of the user interface 1906 (for example, dictation of text into the OIE 1910). The navigation mode 1916 may be associated with navigating to or from an element in the user interface 1906.

The voice module 1912 also includes a speech recognition engine 1918. In one implementation, the speech recognition engine 1918 may be similar to the speech recognition engine 210 depicted in FIG. 2. The speech recognition engine 1918 may, for example, recognize the voice commands spoken by a user in both of the data entry mode 1914 and the navigation mode 1916. The speech recognition engine 1918 need not be part of the voice module 1912 as shown in FIG. 1, and may be separate from, but accessible by, the voice module 1912.

The system 1900 also includes a command grammar 1920 associated with the navigation mode 1916. The command grammar 1920 relates to one or more voice commands recognized by the voice module 1912 when in the navigation mode 1916. The voice commands associated with the command grammar 1920 may relate to, for example, navigating to, from, or between the elements, i.e., entering and exiting elements 1908, 1910 in the user interface 1906. In FIG. 2, such voice commands include: navigation commands 1922, explicit exit commands 1924, implicit exit commands 1926, voice tabs 1928, timeouts 1930, and "all elements" commands 1934. The command grammar 1920 may include additional voice commands. Also, there may be additional command grammars. For example, there may be a command grammar, or other types of grammars, associated with the data entry mode 1914.

In one implementation, the voice commands listed above may be potential methods that the system 1900 may use to determine when a user is finished accessing an OIE. One method for signaling that a user is finished with an OIE is to require an explicit exit command 1924, for example, "done with entry." If an appropriate command can be found that is unlikely to conflict with possible entries in the element itself (to reduce false alarms), this method could be effective and easily learned. Depending on various factors, such as, for example, capabilities of the relevant voice-recognition system, or speech patterns of the user, there may exist in some contexts generally unacceptable levels of recognition of the exit command, as well as a potentially high false alarm rate. As already mentioned, there is also the need for the user to remember the exit command in the first place.

Another method for signaling a finish is to use the implicit exit commands 1926 relating to an implicit exit strategy, referred to and described above. In this method, the user simply issues another navigation command 1922. The system 1900 may then, for example, use a bubbling-out strategy (as described above) to find the highest priority match.

The implicit exit strategy may work well for multi-select lists, where there is no conflict between the navigation command and entries in the list. However, for dictation items, using the implicit exit commands 1926 may cause an unacceptable level of false alarms and missed exits.

In the illustrated implementation of FIG. 19, the voice tab 1928 is a command that allows users to verbally "tab" from one element to another within a set of elements in the user interface 1906, using a single, universal (easily-recognizable and remembered) command. In such implementations, as with a functionality of a conventional "tab" key on a keyboard, a sequence of elements activated by the tab function may be pre-determined as part of the definition of the user interface 1906, or by some other conventional method. In some implementations, the verbal tab described herein may make use of such conventional sequencing methods to determine its own sequencing. Also, it should be understood that such a voice tab may be used in other contexts besides OIEs, such as, for example, closed interface exits or single-select items.

Timeouts 1930 also may be used to signal that a user has finished with an OIE. Timeouts 1930, however, may not be optimal for tasks that either require significant thinking time or are frequently interrupted. Such events may cause premature exit from an OIE, which can greatly affect user efficiency and convenience.

If a user cannot exit using any of the other exit types, or if the user prefers not to use them, an advantage of the timeout 1930 is that a timeout may be set to allow an exit. In some cases, due to the availability of the explicit/implicit commands (i.e., when the timeout option is a "last resort"), the timeout may be set at a longer duration than timeouts used in other contexts that rely exclusively on timeouts (e.g., telephone selection menus). As a result, the possibility of an undesired exit due to timeout is minimized.

In some implementations of the user interface 1906, Representational Enumerated Semi-transparent Overlaid Labels for Voice (RESOLV) icons may be used. RESOLV icons are numerals corresponding to areas of a user interface. A user may select a particular area of a screen by saying the numeral associated with the area. While navigating between elements in the user interface 1906, a user may get stuck, for example, unable to remember a command, unwilling to wait for a timeout, or unable to have a voice recognition system recognize a spoken command. In this example, an "all elements" command 1934 may be used to display to the user the RESOLV icons the user may use to navigate to elements in the user interface 1906. Additionally, a user may issue a "what can I say" command to display all commands allowing a user to navigate to elements in the user interface 1906. In this way, for example, the user may be provided with a forgotten or unknown command for using a particular element.

As described herein, explicit exit commands are used only as one of a plurality of options for exiting an OIE. As mentioned above, this method requires the user to remember the exit command. In contrast with explicit exit commands, implicit exit does not place such a memory burden on the user. Rather, it is assumed that this is what the user will want to do after selecting the desired element. It should be understood that the methods described herein may be used for other OIEs, such as, for example, multi-select lists.

Based on the above, it should be understood that multiple exit strategies, corresponding to at least some of the various elements 1922-1934 are simultaneously made available to the user of the user interface 1906, when using the OIE 1910. For example, the user may be entering text dictation into the OIE 1910, and may have access to all of, for example, explicit exit commands 1924, implicit exit commands 1926, and timeout commands 1930. In this way, a first user may prefer one or the other types of commands. A second user may prefer the explicit exit commands 1924, but may find that the speech recognition engine does not accurately recognize these command(s) when spoken by the second user. In this case, the second user may simply use the implicit exit commands 1926. If these commands fail as well for any reason, the second user may use the verbal tab 1928, or may simply wait for the timeout 1930 to take effect. In this way, an effective exit strategy from the OIE 1910 may be selected or implemented by a wide variety of users.

Figure 20:
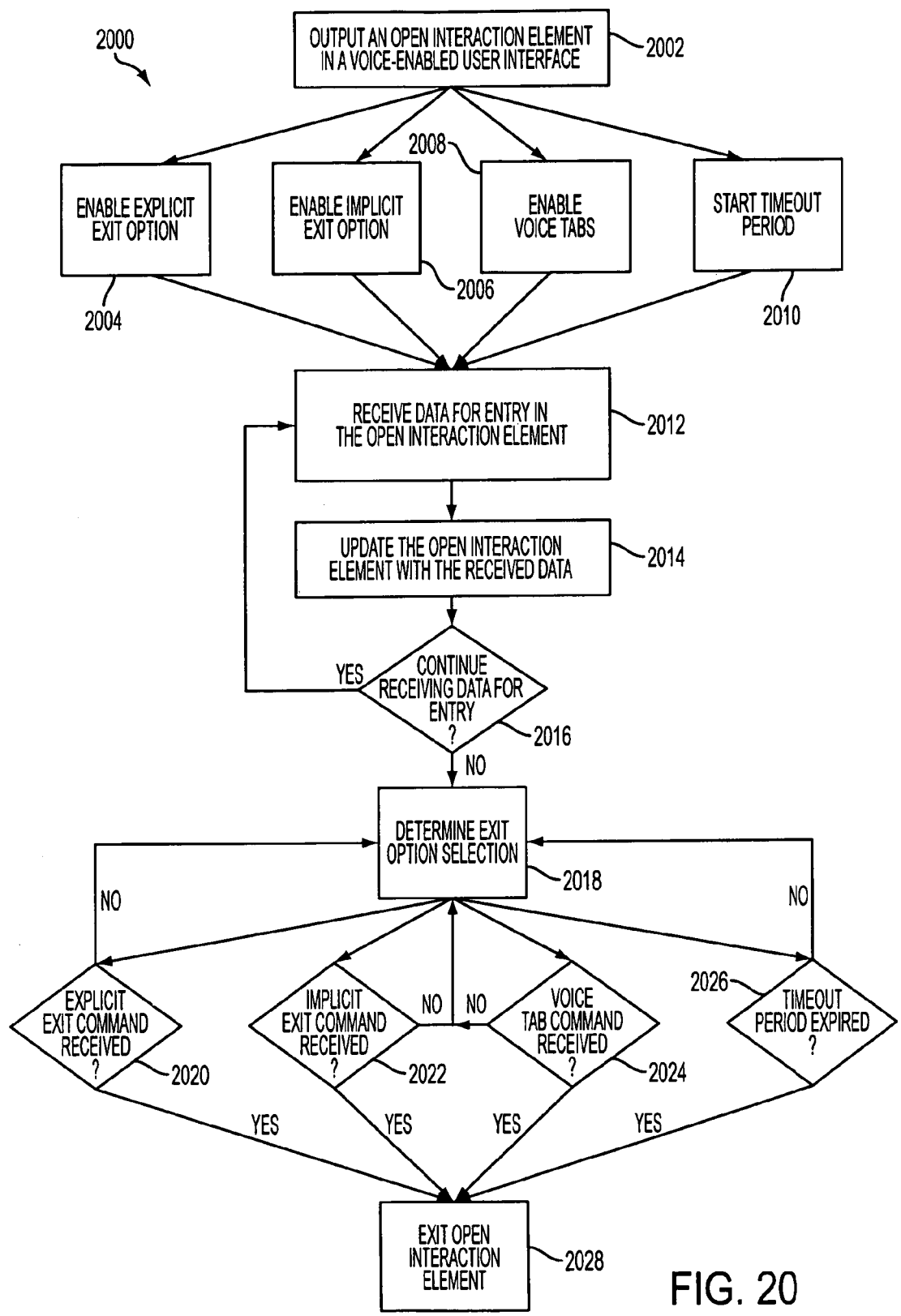
FIG. 20 is a flow chart illustrating a process for accessing an open interaction element using a voice-enabled system.

FIG. 20 is a flow chart illustrating a process 2000 for accessing an open interaction element using a voice-enabled system. The process 2000 may be implemented by, for example, a system similar to the system 1900 in FIG. 19, or by some other voice-enabled system. The process 2000 begins by outputting the open interaction element 1910 in the voice-enabled user interface 1906 (2002). The system 1900 implementing the process 2000 enables various exit strategies, including, in the example of FIG. 20, an explicit exit option (2004), an implicit exit option (2006), and voice tabs (2008). In general, enabling an exit strategy relates to making the exit strategy available for use. The system 1900 is ready to process any of the variety of enabled exit strategies. Additionally, a pre-determined time-out period is started upon a perceived finishing of data entry (2010). Enabling the explicit exit option (2004), the implicit exit option (2006), the voice tabs (2008), and starting the time-out period (2010) may be done simultaneously or in an overlapping manner. Data for entry into the open interaction element 1910 is then received (2012). In one example, the data for entry may be dictation of text from the user.

The open interaction element 1910 is updated with the received data (2014). The user now has the option to continue entering data, or to exit from the open interaction element 1910 (2016). If the system 1900 implementing the process 2000 continues to receive data for entry into the open interaction element 1910, the data will be received (2012) and the open interaction element updated (2014). If the system does not receive data for entry, the system will determine an exit option selection (2018). The process 2000 determines whether an explicit exit command has been received (2020), an implicit exit command has been received (2022), a voice tab has been received (2024), and if the timeout period has been exceeded (2026). The system implementing the process 2000 may perform these determinations simultaneously. Receipt of an explicit exit command, an implicit exit command, a voice tab, or passing of the timeout period results in exiting the open interaction element (2028). Failure to receive the appropriate exit command, voice tab, or not exceeding the timeout period causes the process 2000 to continue to wait to determine an exit selection (2018). As already referred to above, the simultaneous or overlapping enabling of multiple exit strategies from an OIE allows for increased flexibility and reliability for a wide range of users. A user may be able to use various exit strategies singly.

Figure 21:
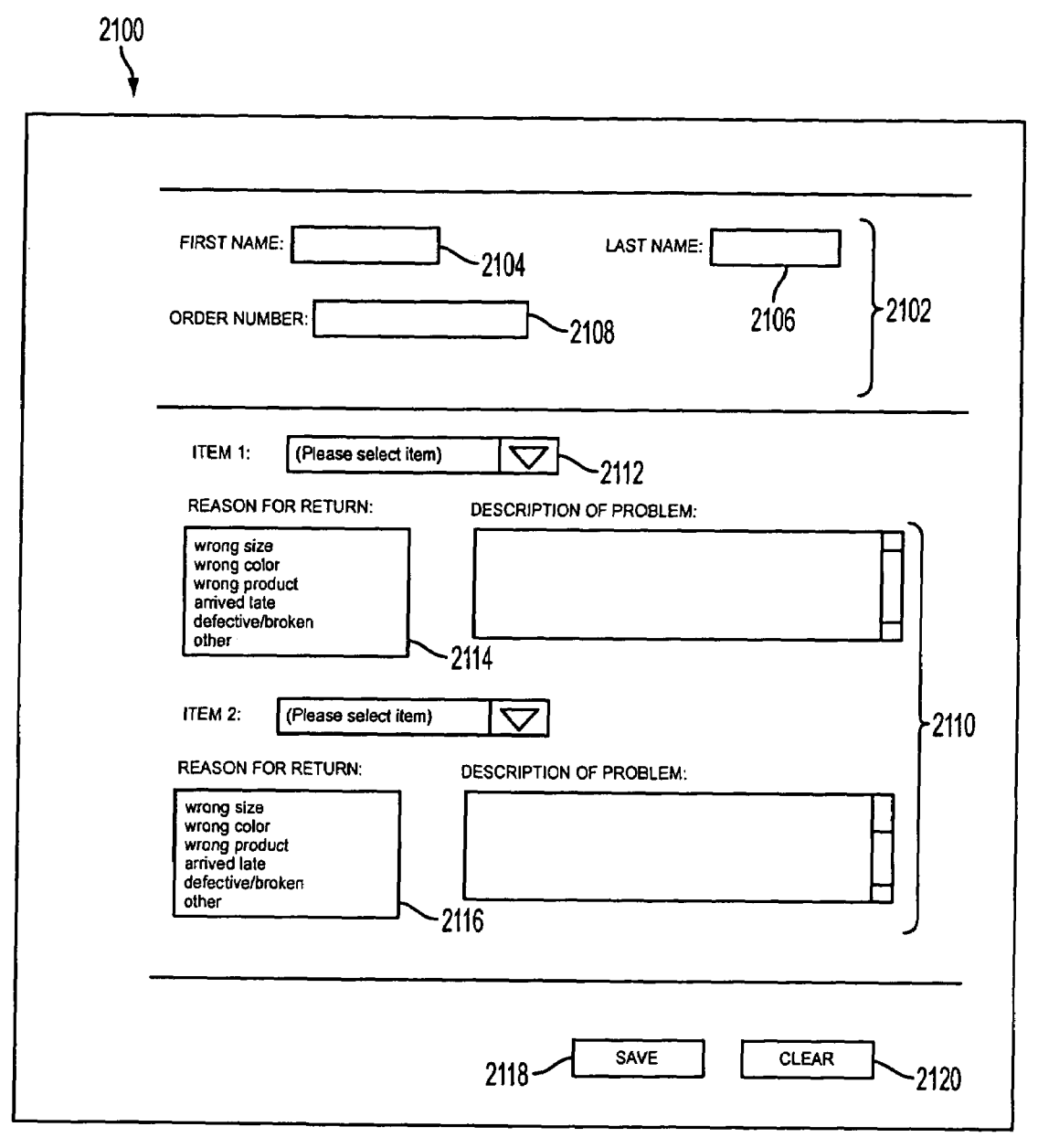

FIG. 21 is an example of a voice-enabled user interface 2100 including open interaction elements. The user interface 2100 is a voice-enabled user interface similar to the voice-enabled user interface 1906 in FIG. 19. In particular, the user interface 2100 is an implementation of a sales return application. The user interface 2100 may be used, for example, by a sales clerk who is in charge of entering data relating to returned items.

In the illustrated implementation, multiple exit options, including using implicit exit commands, explicit exit commands, voice tab commands, timeouts, and "all elements" commands, may be made available to a user for exiting an open interaction element in the user interface 2100. Additionally, a user may be able to use various exit strategies singly.

The user interface 2100 includes an area 2102 including free-text entry fields for entering a first name 2104 and a last name 2106 of a customer returning one or more items. Additionally, there is a text field 2108 for entering an order number associated with the returned item(s). The text fields in the area 2102 may be implemented, such that, a user may exit them using, for example, implicit exit commands, explicit exit commands, or tab commands.

Thus, the clerk may begin by saying "First name" to select the first name field 2104 for data entry. In response, the first name field 2104 may be visually highlighted. The sales clerk may then begin data entry into the first name field 2104 by saying, for example, "Margaret," the first name of the customer returning the item(s). The sales clerk may then say "last name" to switch to the last name field 2106. This is an example of an implicit exit strategy, as the clerk was able to navigate to another element without speaking an explicit exit command, such as, for example "done with entry." As another example, the sales clerk may say "tab," or some other command representative of a verbal tabbing function, to exit the first name field 2104 and enter the last name field 2106.

Once in the last name field 2106, the sales clerk may say "Smith" to enter the last name of the customer. The clerk may then give an explicit exit command, such as, for example "done with entry" to return to a navigation mode. The sales clerk may then say "order number" to enter the order number field 2108. The sales clerk may then say an order number associated with the returned item(s), for example "12345," to enter the order number into the order number field 2108. In one implementation, exit strategies from the order number field 2108 may include timeouts. Thus, for example, if the sales clerk successively attempts to use both an explicit or implicit command, and both of these options fail to result in exit from the filed 2108, then the sales clerk needs only to wait for the timeout period to expire. Once the timeout period is passed, the sales clerk is returned to the navigation mode, or is automatically advanced to the next field.

In an area 2110, the sales clerk enters information relating to the returned item(s). The fields in the area 2110 may be implemented with multiple exit strategies. The sales clerk may say "Item 1" to begin accessing the Item 1 field 2112. In response to the spoken command "Item 1," the user interface may automatically display the drop down menu associated with the Item 1 field 2112. The sales clerk may not need to issue any additional command in order to view the drop down menu. The user interface 2100 may be implemented to assume that once a field is selected, any previously hidden display information associated with the field should be displayed.

The sales clerk may then select an item from the displayed drop down menu of the Item 1 field 2112 by speaking the name of the item. The sales clerk may then say "reason for return" to implicitly exit to a reason for return field 2114. However, there are multiple items (2114 and 2116) called "reason for return." To clarify the intended selection target, the user interface may display unique numbers or other unique identifiers next to each element in the user interface 2100, such that a user may say an identifier associated with an element to access the element. For example, "3A" may be associated with the reason for return field 2114 and "4A" associated with the reason for return field 2116. The sales clerk may say "3A" to return to the reason for return field 2114.

Once the sales clerk has completed entering information into the user interface 2100, the sales clerk may select the "Save" button 2118 or the "Clear" button 2120. Although particular combinations of exit strategies for elements in the user interface 2100 were described above, any combination of one or more exit strategies may be implemented for the elements of the user interface 2100.

The interaction style(s) described herein support voice interaction with data entry elements that require multiple selections or free-form text entry (dictation). These features support users who cannot or do not wish to use a keyboard and mouse, even though they are still able to use a visual display. Examples of such users include people with physical disabilities, users of mobile devices with inadequately sized keyboards and pointing devices, and users whose hands are otherwise occupied.

A number of implementations have been described. Nevertheless, it will be understood that various modifications may be made. Accordingly, other implementations are within the scope of the following claims.

What is claimed is:

1. A method comprising:
   displaying one or more open interaction elements in a voice-enabled user interface;
   receiving, in a navigation mode, a navigation command;
   determining an open interaction element corresponding to the received navigation command;
   entering, in a data entry mode, the open interaction element corresponding to the received navigation command;
   enabling an exit option for the entered open interaction element, wherein the exit option provides for exiting the open interaction element;
   receiving data for the entered open interaction element;
   updating the entered open interaction element with the received data;
   determining if an exit option has been selected;
   exiting the entered open interaction element if it is determined that the exit option has been selected; and
   enabling the navigation mode, if it is determined that the exit option has been selected,
   wherein determining the open interaction element corresponding to the received navigation command comprises:
      determining one or more open interaction elements that match the received navigation command, wherein each open interaction element belongs to a priority group,
      determining matching open interaction elements belonging to the priority group with the highest priority, if only one matching open interaction element belongs to the highest priority group, selecting the matching open interaction element that belongs to the highest priority group, if more than one matching open interaction element belongs to the highest priority group, marking each of the matching open interaction elements belonging to the highest priority group in the user interface with a unique number, receiving a navigation command indicating one of the unique numbers, and selecting the open interaction element corresponding to the indicated unique numbers.

2. The method of claim 1, wherein determining if an exit option has been selected comprises determining if an explicit exit command has been received.

3. The method of claim 1, wherein determining if an exit option has been selected comprises determining if an implicit exit command has been received.

4. The method of claim 1, wherein determining if an exit option has been selected comprises determining if a timeout period has expired.

5. The method of claim 1, wherein determining if an exit option has been selected comprises determining if a tab command has been received.

6. The method of claim 1, wherein the open interaction element is adapted to receive multiple data entries.

7. The method of claim 1, wherein receiving data for the entered open interaction element comprises a voice module translating voice data to text data using a speech recognition engine, and receiving the text data from the voice module.

8. The method of claim 7, wherein the voice module translating voice data to text data using a speech recognition engine further comprises retrieving a grammar associated with the entered open interaction element, and translating voice data to text data using the speech recognition engine and the retrieved grammar.

9. The method of claim 8, wherein the grammar is one of a date grammar and a name grammar.

10. The method of claim 1, wherein marking each of the matching open interaction elements belonging to the highest priority group in the user interface with a unique number comprises displaying semi-transparent overlays of the unique number over the corresponding open interaction elements in the user interface.

11. A method comprising:
receiving a user interface, the user interface including user interface elements;
parsing the received user interface to locate user interface elements;
processing the located user interface elements to generate voice enabled user interface elements;
prioritizing the voice enabled user interface elements into priority groups based on their location in the user interface; and
displaying the received user interface including the voice enabled user interface elements,
wherein processing the located user interface elements to make them voice enabled comprises:
translating each located user interface element to create a speakable identifier, and
associating the speakable identifier with the corresponding user interface element; and
wherein translating each located user interface element to create a speakable identifier, comprises:
extracting text from the user interface element;
using a speech recognition engine to generate a speakable identifier from the extracted text; and
adding the generated speakable identifier to a library of speakable identifiers.

12. The method of claim 11, wherein the user interface elements are XML elements or HTML elements.

13. A device comprising:
a display module adapted to display a user interface, the user interface comprising a plurality of open interaction elements; and
a navigation and data entry module adapted to:
receive, in a navigation mode, a navigation command;
determine an open interaction element corresponding to the received navigation command;
enter, in a data entry mode, the open interaction element corresponding to the received navigation command;
enable an exit option for the entered open interaction element, wherein the exit option provides for exiting the open interaction element;
receive data for the entered open interaction element;
update the entered open interaction element with the received data;
determine if the exit option has been selected;
exit the entered open interaction element if it is determined that the exit option has been selected; and
enable the navigation mode, if it is determined that the exit option has been selected,
wherein, in determining the open interaction element corresponding to the received navigation command, the navigation and data entry module is further adapted to:
determine one or more open interaction elements that match the received navigation command, wherein each open interaction element belongs to a priority group,
determine matching open interaction elements belonging to the priority group with the highest priority,
if only one matching open interaction element belongs to the highest priority group, select the matching open interaction element that belongs to the highest priority group,
if more than one matching open interaction element belongs to the highest priority group, mark each of the matching open interaction elements belonging to the highest priority group in the user interface with a unique number,
receive a navigation command indicating one of the unique numbers, and
select the open interaction element corresponding to the indicated unique numbers.

14. A computer readable medium encoded with a computer program comprising instructions that, when read by a machine, operate to cause a data processing apparatus to:
display one or more open interaction elements in a voice-enabled user interface;
receive, in a navigation mode, a navigation command;
determine an open interaction element corresponding to the received navigation command;
enter, in a data entry mode, the open interaction element corresponding to the received navigation command;
enable an exit option for the entered open interaction element, wherein the exit option provides for exiting the open interaction element;
receive data for the entered open interaction element;
update the entered open interaction element with the received data;
determine if the exit option has been selected;

exit the entered open interaction element if it is determined that the exit option has been selected; and enable the navigation mode, if it is determined that the exit option has been selected, wherein, in determining the open interaction element corresponding to the received navigation command, the instructions further operate to cause the data processing apparatus to:

determine one or more open interaction elements that match the received navigation command, wherein each open interaction element belongs to a priority group, determine matching open interaction elements belonging to the priority group with the highest priority, if only one matching open interaction element belongs to the highest priority group, select the matching open interaction element that belongs to the highest priority group, if more than one matching open interaction element belongs to the highest priority group, mark each of the matching open interaction elements belonging to the highest priority group in the user interface with a unique number, receive a navigation command indicating one of the unique numbers, and select the open interaction element corresponding to the indicated unique numbers.

* * * * *